US011978372B1

(12) United States Patent
Modaikkal et al.

(10) Patent No.: US 11,978,372 B1
(45) Date of Patent: May 7, 2024

(54) SYNCHRONIZED DUAL EYE VARIABLE REFRESH RATE UPDATE FOR VR DISPLAY

(71) Applicant: QUALCOMM Incorporated, San Diego, CA (US)

(72) Inventors: Sreekanth Modaikkal, Bangalore (IN); Kumar Saurabh, Bangalore (IN); Kalyan Thota, Hyderabad (IN); Vishnuvardhan Prodduturi, Hyderabad (IN); Chun Wang, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/318,646

(22) Filed: May 16, 2023

(51) Int. Cl.
*G09G 3/00* (2006.01)
*G06F 3/01* (2006.01)
*G06F 3/14* (2006.01)
*G09G 5/12* (2006.01)

(52) U.S. Cl.
CPC ............ *G09G 3/002* (2013.01); *G06F 3/011* (2013.01); *G06F 3/1423* (2013.01); *G09G 5/12* (2013.01); *G06F 2203/01* (2013.01)

(58) Field of Classification Search
CPC .......... G09G 3/002; G09G 5/12; G06F 3/011; G06F 3/1423; G06F 2203/01
See application file for complete search history.

(56) References Cited

U.S. PATENT DOCUMENTS

| 2006/0165278 | A1* | 7/2006 | Uryu ..................... G09G 5/006 382/162 |
| 2011/0279463 | A1* | 11/2011 | Yang ......................... G06T 1/60 345/522 |
| 2014/0092150 | A1* | 4/2014 | Slavenburg ............ G09G 5/001 345/698 |
| 2017/0053620 | A1* | 2/2017 | Law ....................... G09G 5/395 |
| 2018/0307042 | A1 | 10/2018 | Riguer |
| 2019/0129848 | A1* | 5/2019 | Hu ........................... G06F 9/526 |
| 2019/0187995 | A1* | 6/2019 | Terry .................. G06F 9/38585 |
| 2021/0339130 | A1* | 11/2021 | Sameer Kalathil ......................... H04N 21/6582 |
| 2021/0350771 | A1 | 11/2021 | Choi et al. |
| 2022/0013087 | A1 | 1/2022 | Marchya |
| 2022/0208145 | A1 | 6/2022 | Glen |

* cited by examiner

*Primary Examiner* — Dmitriy Bolotin
(74) *Attorney, Agent, or Firm* — Procopio, Cory, Hargreaves & Savitch

(57) ABSTRACT

This disclosure provides systems, devices, apparatus, and methods, including computer programs encoded on storage media, for synchronized dual eye variable refresh rate update for a VR display. A display processor obtains an indication of a synchronous flush or an asynchronous flush with respect to a first DPU and/or a second DPU. The display processor determines whether a first flush operation and/or a second flush operation is available at a time instance, where the first flush operation and the second flush operation are associated with the first DPU and/or the second DPU. The display processor performs, based on a VSync instance, the first flush operation and/or the second flush operation based on whether the first flush operation and/or the second flush operation are available at the time instance and based on the indication of the synchronous flush or the asynchronous flush.

30 Claims, 29 Drawing Sheets

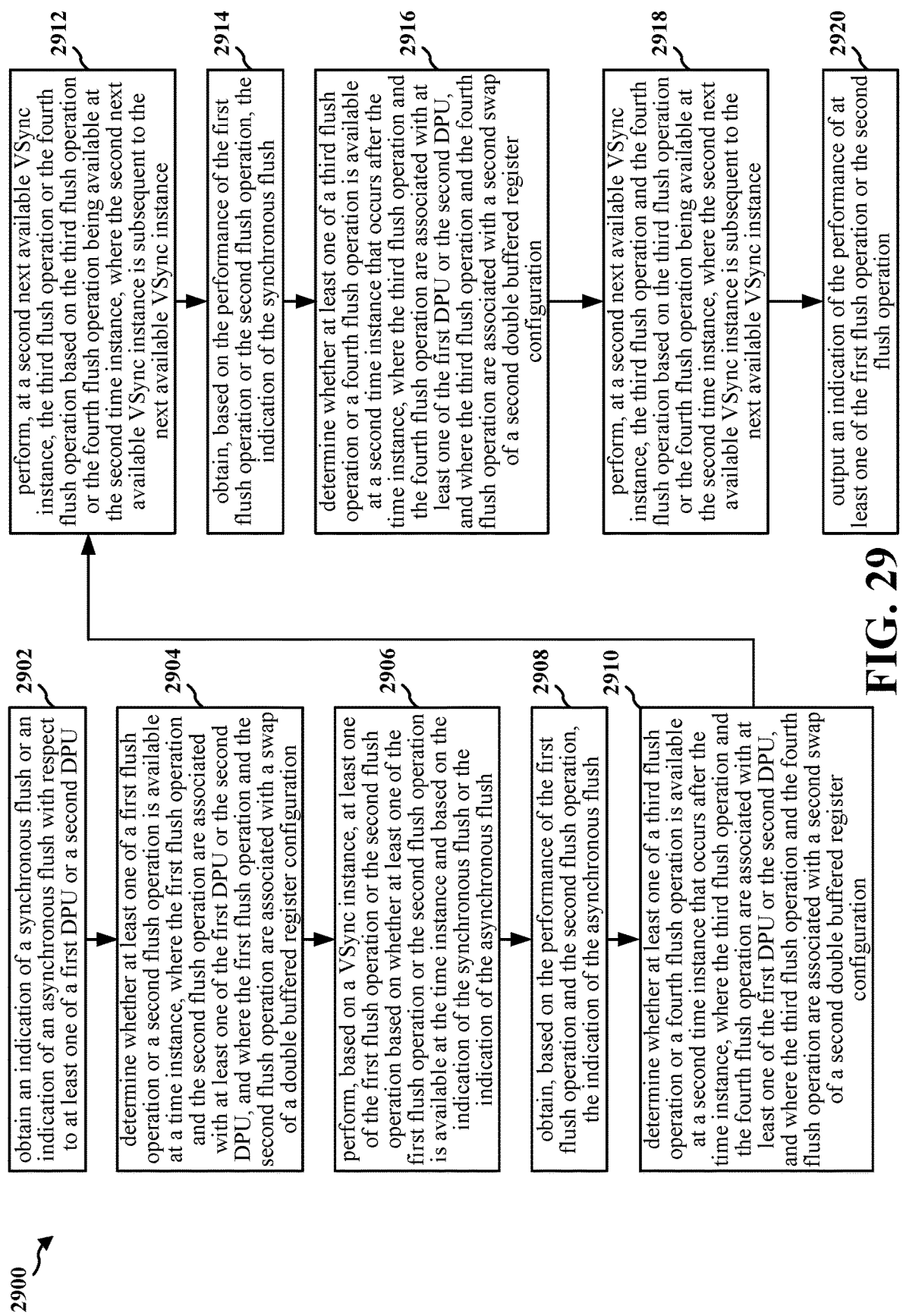

SYNCHRONIZED DUAL EYE VARIABLE REFRESH RATE UPDATE FOR VR DISPLAY

TECHNICAL FIELD

The present disclosure relates generally to processing systems, and more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for variable refresh rate updates for virtual reality (VR) displays may not address skew drift that may occur as a result of the variable refresh rate updates. There is a need for improved techniques for mitigating skew drift.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for display processing are provided. The apparatus includes a memory; and a processor coupled to the memory and, based on information stored in the memory, the processor is configured to: obtain an indication of a synchronous flush or an indication of an asynchronous flush with respect to at least one of a first display processing unit (DPU) or a second DPU; determine whether at least one of a first flush operation or a second flush operation is available at a time instance, where the first flush operation and the second flush operation are associated with at least one of the first DPU or the second DPU, and where the first flush operation and the second flush operation are associated with a swap of a double buffered register configuration; and perform, based on a vertical synchronization (VSync) instance, at least one of the first flush operation or the second flush operation based on whether at least one of the first flush operation or the second flush operation is available at the time instance and based on the indication of the synchronous flush or the indication of the asynchronous flush.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 29 is a flowchart of an example method of display processing in accordance with one or more techniques of this disclosure.

DETAILED DESCRIPTION

Figure 1:
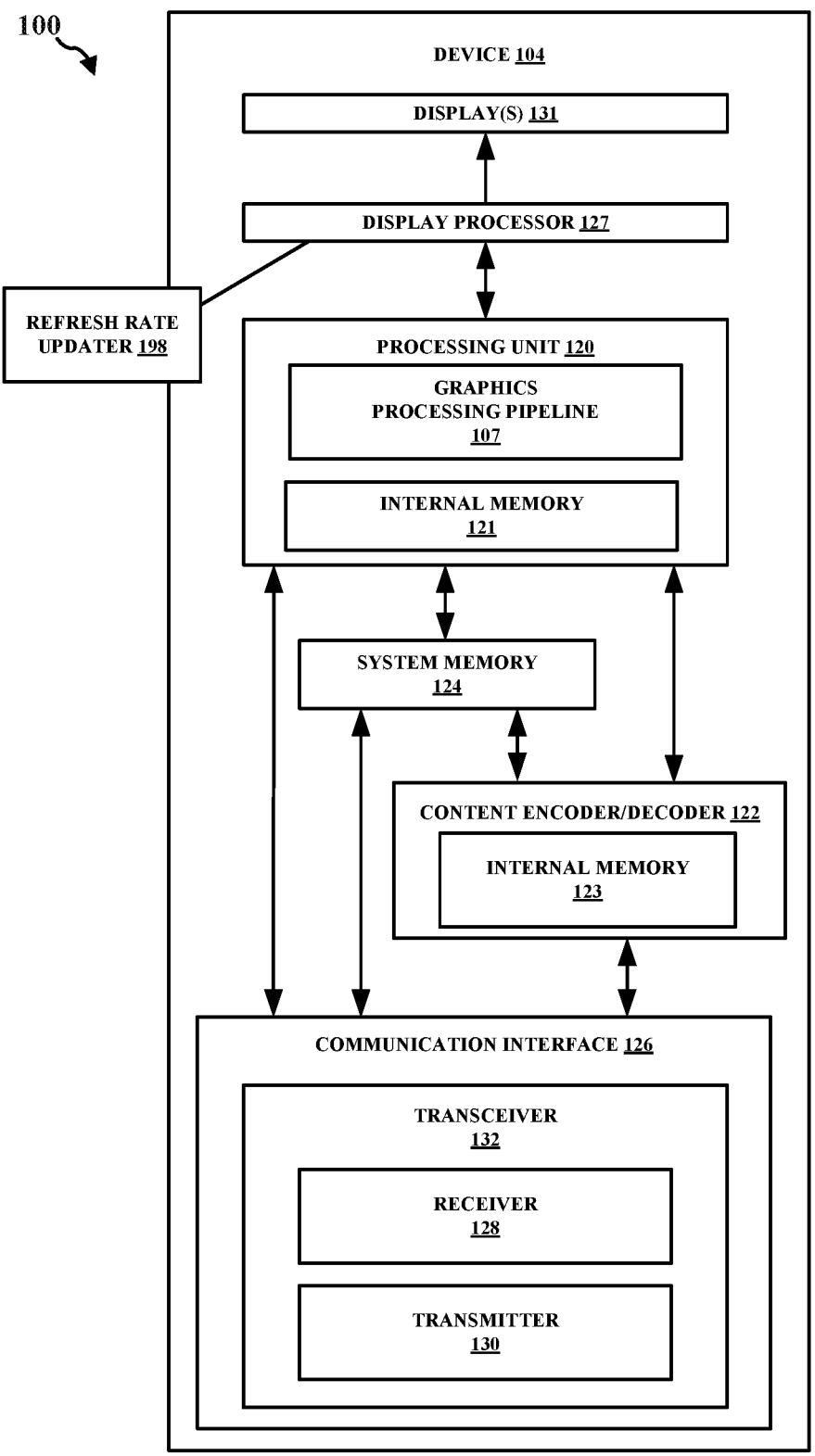
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

A display device (e.g., a virtual reality (VR) headset) may include a first display panel and a second display panel, where the first display panel presents frames that are intended to be viewed by a first eye (e.g., a left eye) of a user and the second display panel presents frames that are intended to be viewed by a second eye (e.g., a right eye) of the user. When the viewer views frames on the first display panel and the second display panel via different eyes, the frames may enable the user to perceive an immersive experience. A skew (e.g., 8.3 ms) may exist between the first display panel and the second display panel, that is, a first frame may be displayed on a first display panel at a first point in time and a second frame may be displayed on a second display panel at a second point in time. However, when perceived by a user, the first frame and the second frame may appear to be presented concurrently to the user due to physiological reasons and hence via the skew, the first frame and the second frame may form a coherent image to the user. A display device may be configured with a skew between display panels so that display related activities (e.g., panel calibration, back light adjustment, etc.) between display panels may occur in a mutually exclusive manner. For instance, such display related activities may occur during a blank period of the display device. Without a skew, both display panels may have the same instance of a blanking period and performing the display related activities may utilize up to two times the peak power of the display panels. By staggering (i.e., skewing) the display related activities between two display panels, peak power consumption may be reduced. The first display panel and/or the second display panel may undergo a variable refresh rate update in which a refresh rate of the first display panel and/or the second display panel may change. Variable refresh rate updates may cause a drift (e.g., an increase or a decrease) in the skew between the first display panel and the second display panel. For instance, the drift in the skew may be caused by a delay in implementing the variable refresh rate update at one of the first display or the second display. The drift in skew may impact user experience.

Various technologies pertaining to synchronized dual eye variable refresh rate updates for a VR display (or another type of display, such as an extended reality (XR) display) are described herein. In an example, an apparatus (e.g., a DPU in a VR display) obtains an indication of a synchronous flush or an indication of an asynchronous flush with respect to at least one of a first DPU or a second DPU. A synchronous flush may refer to a flush (i.e., a flush operation) that is to occur (1) after an instruction for the flush is received from software and (2) after the first DPU and the second DPU (or a first controller and a second controller of the first DPU) exchange acknowledgments that the flush is to be performed. An asynchronous flush may refer to a flush that is performed after an instruction for the flush is received by software. Asynchronous flushes may be performed independently (i.e., without receiving acknowledgments) at different DPUs. The apparatus determines whether at least one of a first flush operation or a second flush operation is available at a time instance, where the first flush operation and the second flush operation are associated with at least one of the first DPU or the second DPU, and where the first flush operation and the second flush operation are associated with a swap of a double buffered register configuration. The apparatus performs, based on a VSync instance, at least one of the first flush operation or the second flush operation based on whether at least one of the first flush operation or the second flush operation is available at the time instance and based on the indication of the synchronous flush or the indication of the asynchronous flush. Performing at least one of the first flush operation or the second flush operation may include performing a handshake between software associated with at least one of the first DPU or the second DPU and hardware associated with at least one of the first DPU or the second DPU. Performing the handshake may cause the hardware associated with at least one of the first DPU or the second DPU to swap the double buffered register configuration and clear a flush flag associated with at least one of the first flush operation or the second flush operation. Vis-à-vis the above-described technologies, the apparatus may eliminate or mitigate a drift in skew between a first display panel and a second display panel. Thus, the above-described technologies may help to improve a user experience with a VR display (or another type of display).

In a VR use case (which may involve a right eye display and a left eye display to be skewed), a variable refresh rate update may cause a skew drift due to an asynchronous flush. In one aspect, master and slave software (SW) may work independently on their respective Vsyncs. The flush may be independent for SW, and internally, hardware (HW) may synchronize the flush between DPU cores. A synchronized HW flush logic is discussed herein. After a flush snapshot, if both DPUs have flushes that are available, then the flushes may be consumed for an upcoming Vsync. Otherwise, the flushes may not be consumed and a previous frame may be used. Dynamic switching between sync flush and async flush is also discussed herein.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a refresh rate updater 198 configured to obtain an indication of a synchronous flush or an indication of an asynchronous flush with respect to at least one of a first DPU or a second DPU; determine whether at least one of a first flush operation or a second flush operation is available at a time instance, where the first flush operation and the second flush operation are associated with at least one of the first DPU or the second DPU, and where the first flush operation and the second flush operation are associated with a swap of a double buffered register configuration; and perform, based on a VSync instance, at least one of the first flush operation or the second flush operation based on whether at least one of the first flush operation or the second flush operation is available at the time instance and based on the indication of the synchronous flush or the indication of the asynchronous flush. Although the following description may be focused on display processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU), but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
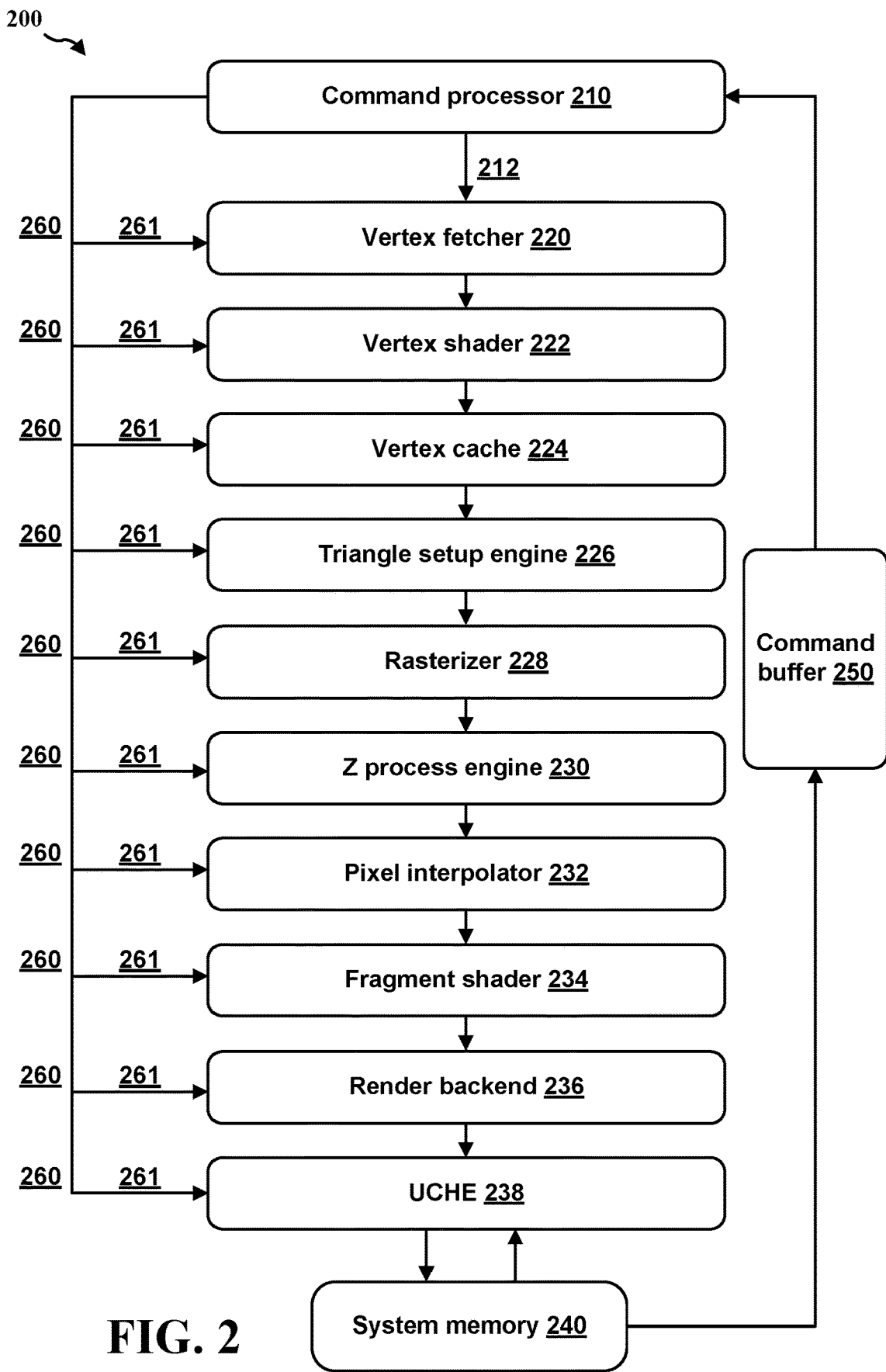
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
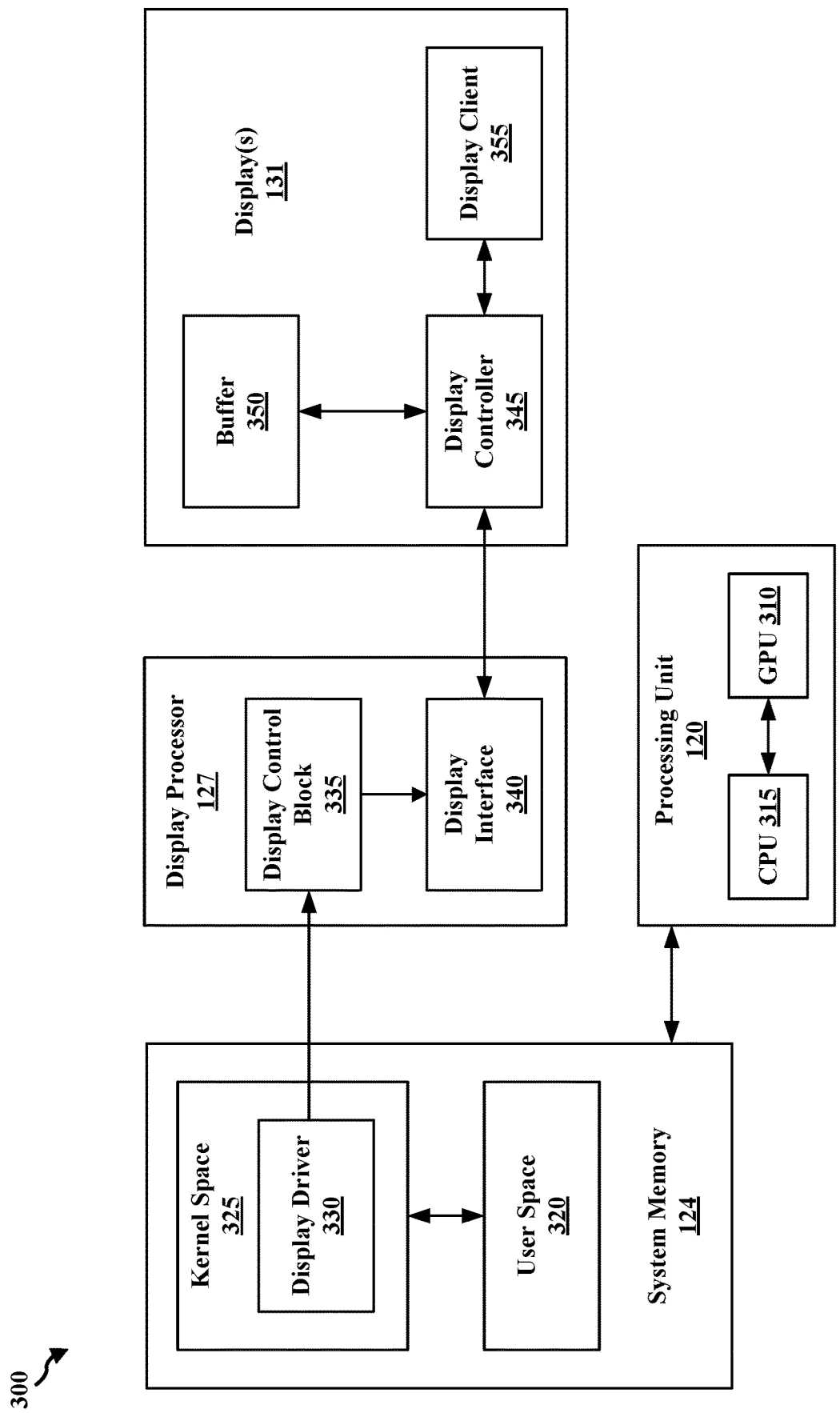
FIG. 3 illustrates an example display framework including a display processor and a display GPU in accordance with one or more techniques of this disclosure.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
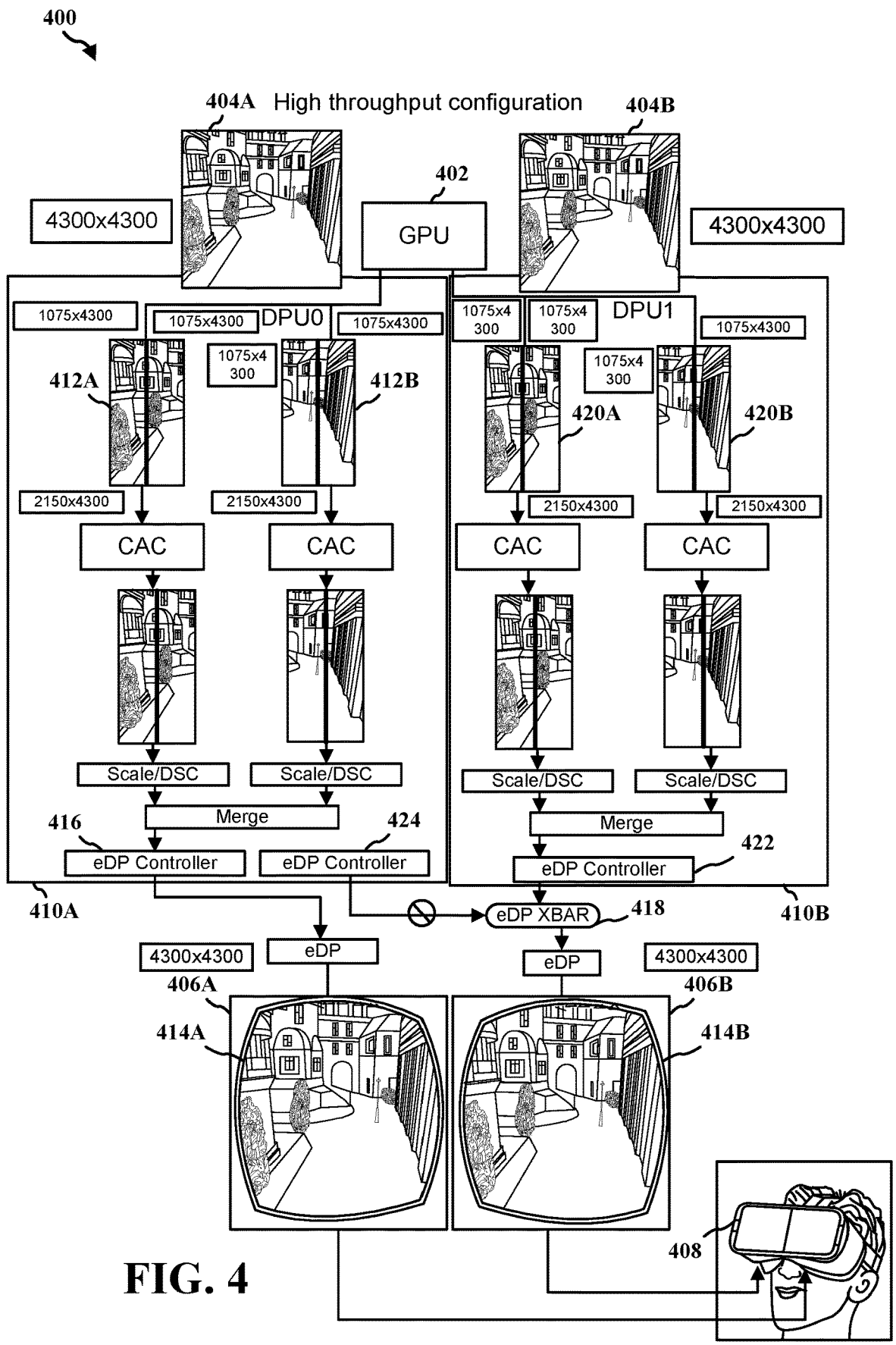
FIG. 4 is a diagram illustrating an example of a high throughput display processing unit (DPU) configuration in accordance with one or more techniques of this disclosure.

FIG. 4 is a diagram 400 illustrating an example of a high throughput DPU configuration. A GPU 402 may obtain a first frame 404A and a second frame 404B. The first frame 404A and the second frame 404B may be associated with user content (UC) that is to be displayed to a user (e.g., concurrently displayed to the user). In an example, the first frame 404A may be for display on a first display 406A of a wearable headset 408 and the second frame 404B may be for display on a second display 406B of the wearable headset 408. For instance, the first frame 404A may be for display to a left eye of the user and the second frame 404B may be for display to a right eye of the user. In an example, the first display 406A and the second display 406B may be embedded DisplayPort (eDP) displays. In another example, the first display 406A and the second display 406B may part of a single display panel, that is, the first display 406A may be a first portion (e.g., a left portion) of the single display and the second display 406B may be a second portion (e.g., a right portion) of the single display. The wearable headset 408 may be an augmented reality (AR) headset, a virtual reality (VR) headset, a mixed reality (MR) headset, and/or an extended reality (XR) headset. As such, the first frame 404A and the second frame 404B may be associated with augmented reality content, VR content, MR content, and/or XR content. In an example, the first frame 404A and the second frame 404B may have a resolution of 4300×4300 pixels.

The GPU 402 may provide the first frame 404A to a first DPU 410A (labeled as "DPU0" in FIG. 4). The first DPU 410A may be included in the wearable headset 408. The first DPU 410A may divide the first frame 404A into a first slice 412A and an Nth slice 412B, where N is a positive integer greater than one. The first slice 412A and the Nth slice 412B may be collectively referred to as "a first plurality of slices 412A-412B." In an example, each of the first plurality of slices 412A-412B may be vertical slices. In an example in which N is 4, each slice in the first plurality of slices 412A-412B may have a resolution of 1075×4300 pixels. In an example in which N is 2, each slice in the first plurality of slices 412A-412B may have a resolution of 2150×4300 pixels.

The first DPU 410A may perform chromatic aberration correction (CAC) on each of the first plurality of slices 412A-412B. Chromatic aberration may refer to an optical aberration that is caused by a failure of a lens to focus all colors at the same point. Chromatic aberration may be observed as fringes of color along boundaries that separate dark parts and bright parts of an image. CAC may refer to a process that minimizes chromatic aberration.

The first DPU 410A may perform a scaling/DSC operation on each of the first plurality of slices 412A-412B. A scaling/DSC operation may refer to a display stream compression. Display stream compression may be a visually lossless compression that reduces bandwidth demands on a DPU. The first DPU 410A may merge each of the first plurality of slices 412A-412B to generate a first processed frame 414A. The first processed frame 414A may have the same resolution as the first frame 404A (e.g., 4300×4300 pixels). A first embedded DisplayPort (eDP) controller 416 of the first DPU 410A may cause the first processed frame 414A to be displayed on the first display 406A (e.g., via a eDP interface).

An eDP crossbar (e.g., "an eDP XBAR 418") may be associated with the first DPU 410A and a second DPU 410B (labeled as "DPU1" in FIG. 4). In an example, the eDP XBAR 418 may be part of the first DPU 410A and/or the second DPU 410B. The eDP XBAR 418 may obtain an indication that the UC is to be displayed (e.g., rendered) at a high resolution (e.g., 4300×4300 pixels on each of the first display 406A and the second display 406B). The eDP XBAR 418 may determine that the second DPU 410B is to be utilized to drive display of the second frame 404B based on the indication. In one aspect, the eDP XBAR 418 may be a XBAR module that may be implemented to multiplex (MUX) an eDP interface of a controller from the first DPU 410A and an eDP interface of the second DPU 410B. The eDP XBAR 418 may be software controllable. According to examples, the eDP XBAR 418 may be controlled by a display driver, display driver software, or a CPU. In an example, the first DPU 410A and the second DPU 410B may be part of a system-on-chip (SOC).

Based on an output of the eDP XBAR 418, the GPU 402 may provide the second frame 404B to the second DPU 410B. The second DPU 410B may be included in the wearable headset 408. The second DPU 410B may divide the second frame 404B into a first slice 420A and an Nth slice 420B, where N is a positive integer greater than one. The first slice 420A and the Nth slice 420B may be collectively referred to as "a second plurality of slices 420A-420B." In an example, each of the second plurality of slices 420A-420B may be vertical slices. In an example in which N is 4, each slice in the second plurality of slices 420A-420B may have a resolution of 1075×4300 pixels. In an example in which N is 2, each slice in the second plurality of slices 420A-420B may have a resolution of 2150×4300 pixels.

The second DPU 410B may perform CAC on each of the second plurality of slices 420A-420B. The second DPU 410B may perform a scaling/DSC operation on each of the second plurality of slices 420A-420B. The second DPU 410B may merge each of the second plurality of slices 420A-420B to generate a second processed frame 414B. The second processed frame 414B may have the same resolution as the second frame 404B (e.g., 4300×4300 pixels). An eDP controller 422 of the second DPU 410B may cause the second processed frame 414B to be displayed on the second display 406B (e.g., via a eDP interface) concurrently with the first processed frame 414A. A second eDP controller 424 of the first DPU 410A may remain inactive based on the determination by the eDP XBAR 418 that the UC was to be rendered at the high resolution.

Figure 5:
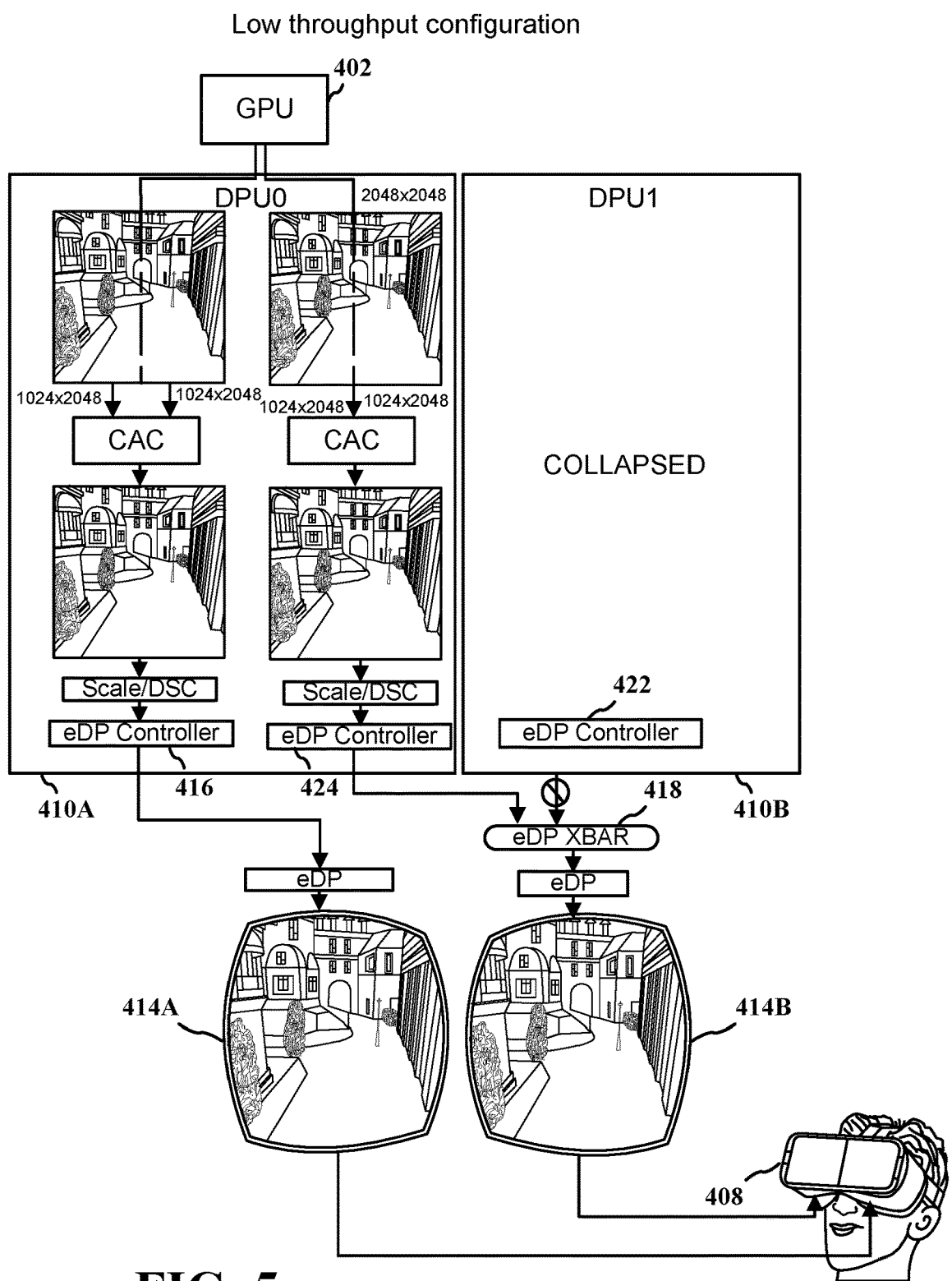
FIG. 5 is a diagram illustrating an example of a low throughput DPU configuration in accordance with one or more techniques of this disclosure.

FIG. 5 is a diagram 500 illustrating an example of a low throughput DPU configuration. In the low throughput DPU configuration, the eDP XBAR 418 may obtain an indication that UC is to be displayed (e.g., rendered) at a low resolution (e.g., 2048×2048 pixels on each of the first display 406A and the second display 406B). The eDP XBAR 418 may determine that the second eDP controller 424 of the first DPU 410A is to be utilized to drive display of the second frame 404B based on the indication while the second DPU 410B is to be placed in a power collapsed state. The term power collapsed state may refer to a scenario in which power is removed (i.e., a current and a voltage are cut off) from a DPU. In an example, the power collapsed state may be a globally distributed switch (GDS) power collapsed state.

In the low throughput DPU configuration, the GPU 402 may obtain the first frame 404A and the second frame 404B. Based on a determination by the eDP XBAR 418, the GPU 402 may provide the first frame 404A and the second frame 404B to the first DPU 410A. The first DPU 410A may divide the first frame 404A and the second frame 404B into the first plurality of slices 412A-412B and the second plurality of slices 420A-420B. In an example, each of the first plurality of slices 412A-412B and each of the second plurality of slices 420A-420B may have a resolution of 1024×2048 pixels. The first DPU 410A may perform CAC on each of the first plurality of slices 412A-412B and the second plurality of slices 420A-420B. The first DPU 410A may perform a scaling/DSC operation on each of the first plurality of slices 412A-412B and each of the second plurality of slices 420A-420B. The first DPU 410A may merge each of the first plurality of slices 412A-412B to generate the first processed frame 414A. The first DPU 410A may merge each of the second plurality of slices 420A-420B to generate the second processed frame 414B.

The first eDP controller of the first DPU 410A may cause the first processed frame 414A to be displayed on the first display 406A. Similarly, based on the determination of the eDP XBAR 418, the second eDP controller 424 of the first DPU 410A may cause the second processed frame 414B to be displayed on the second display 406B concurrently with the first processed frame 414A being displayed on the first display 406A.

Figure 6:
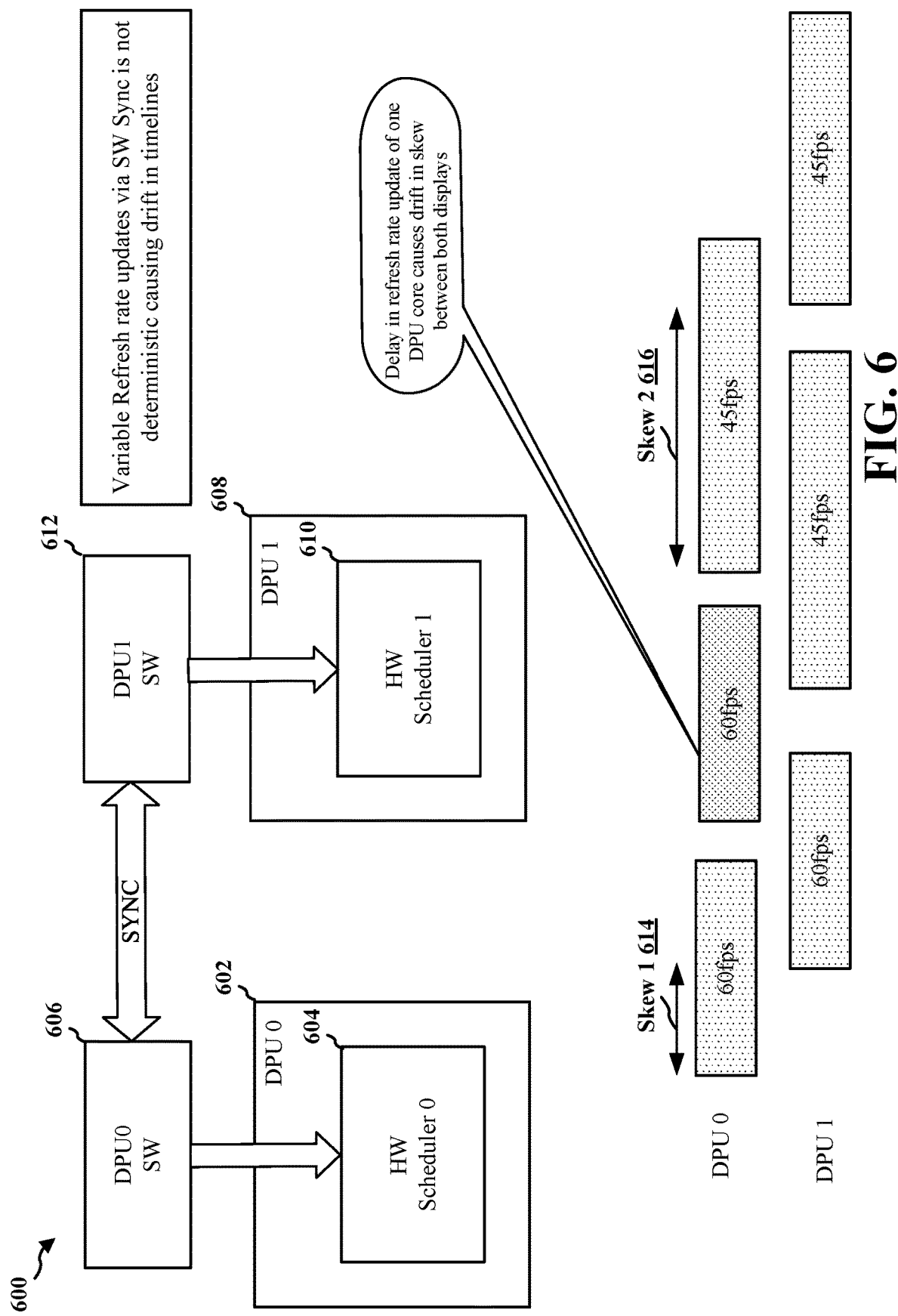
FIG. 6 is a diagram illustrating example aspects of variable refresh rate updates in accordance with one or more techniques of this disclosure.

FIG. 6 is a diagram 600 illustrating example aspects of variable refresh rate updates in accordance with one or more techniques of this disclosure. An extended reality (XR) headset (e.g., a virtual reality (VR) headset, an augmented reality (AR) headset, or a mixed reality (MR) headset) may include a first display panel and a second display panel, where the first display panel may display frames that are intended to be viewed by a first eye (e.g., a left eye) of a user wearing the headset and where the second display panel may display frames that are intended to be viewed by a second eye (e.g., a right eye) of the user wearing the headset. The first display panel (e.g., the first display 406A) may be driven by a first DPU (e.g., the first DPU 410A) and the second display panel (e.g., the second display 406B) may be driven by a second DPU (e.g., the second DPU 410B).

In an example, a first display panel (e.g., the first display 406A) of a display device (e.g., the wearable headset 408, an XR headset, etc.) may be driven by a first DPU 602 (referred to in FIG. 6 as "DPU 0"). The first DPU 602 may include a first hardware scheduler 604 (referred to in FIG. 6 as "HW scheduler 0"), where the first hardware scheduler 604 may be responsible for performing actions pertaining to scheduling the display of frames on the first display panel. The display device may include first DPU software 606 (referred to in FIG. 6 as "DPU0 SW") that may communicate with the first hardware scheduler 604 in order to facilitate the display of frames on the first display panel. Likewise, a second display panel (e.g., the second display 406B) of the display device may be driven by a second DPU 608 (referred to in FIG. 6 as "DPU 1"). The second DPU 608 may include a second hardware scheduler 610 (referred to in FIG. 6 as "HW scheduler 1"), where the second hardware scheduler 610 may be responsible for performing actions pertaining to scheduling the display of frames on the second display panel. The display device may include second DPU software 612 (referred to in FIG. 6 as "DPU1 SW") that may communicate with the second hardware scheduler 610 in order to facilitate the display of frames on the second display panel. The first DPU software 606 and the second DPU software 612 may synchronize with one another in order to facilitate the presentation of frames on the first display panel and the second display panel. For instance, by synchronizing with one another, the first DPU software 606 and the second DPU software 612 may help to ensure that a first frame is displayed on the first display panel and a second frame is displayed on the second display panel such that the first frame and the second frame form a coherent image to a user. In an example, the first frame may display a left half of an object at a point in time and the second frame may display a right half of the object at the point in time. Via synchronization, the user may perceive both the left half of the object (via a left eye) and the right half of the object (via a right eye) at the same time.

The display device may present frames with a skew between a first display panel and a second display panel, that is, a first frame may be displayed on a first display panel at a first point in time and a second frame may be displayed on a second display panel at a second point in time. However, when perceived by a user, the first frame and the second frame may appear to be presented concurrently to the user due to physiological reasons and hence via the skew, the first frame and the second frame may form a coherent image to the user. A display device may be configured with a skew between display panels so that display related activities (e.g., panel calibration, back light adjustment, etc.) between display panels may occur in a mutually exclusive manner. For instance, such display related activities may occur during a blank period of the display device. Without a skew, both display panels may have the same instance of a blanking period and performing the display related activities may utilize up to two times the peak power of the display panels. By staggering (i.e., skewing) the display related activities between two display panels, peak power consumption may be reduced. In an example, if a skew of 8.3 ms exists between the first display panel and the second display panel, the first display panel may display a first frame and the second display panel may display a second frame corresponding to the first frame 8.3 ms after the first frame is displayed.

The display device may present frames at different frame rates on the first display panel and the second display panel. For instance, the display panel may present frames at 60 frames per second (FPS) on both the first display panel and the second display panel, 45 FPS on both the first display panel and the second display panel, etc. The display device may synchronize frame rates of content with refresh rates of the display panels (via a vertical synchronization process, which may be referred to as vsync, Vsync, VSync, or VSYNC). For instance, content may be available at 60 FPS and the first display panel and the second display panel may have a refresh rate of 95 Hz. Via Vsync, the refresh rate of the first display panel and the second display panel may be set to 60 Hz to match the 60 FPS content.

Additionally, when a skew exists and Vsync is enabled, frame rates/refresh rates may (temporarily) vary between the first display panel and the second display panel. In an example, a skew (e.g., 8.3 ms) may exist between the first display panel and the second display panel. The first display panel may be displaying content at 60 FPS (60 Hz) and the second display panel may be displaying content at 60 FPS (60 Hz). A variable refresh update may occur which causes the frame rate/refresh rate to be updated from 60 FPS (60 Hz) to 45 FPS (45 Hz). Due to the skew, there may be a period of time (e.g., the 8.3 ms of the skew) where the first display panel displays content at 60 FPS (60 Hz) and the second display panel displays content at 45 FPS (45 Hz). After the period of time elapses, the first display panel may be updated to display content at 45 FPS (45 Hz) such that the first display panel and the second display panel both display content at 45 FPS (45 Hz).

A variable refresh rate update may be performed via software synchronization (sync) (e.g., between the first DPU software 606 and the second DPU software 612). A variable refresh rate update via software sync may not be deterministic and thus may cause a drift in skew between the first display panel and the second display panel. For instance, a delay in a refresh rate update of a DPU core of the first DPU 602 or the second DPU 608 may cause the skew to drift. If the skew drifts over (or under) an intended skew (e.g., 8.3 ms), user experience may be affected.

In an example, the first DPU 602 may be displaying content at 60 fps on the first display panel and the second DPU 608 may be displaying content at 60 FPS on the second display panel, where a first skew 614 (e.g., 8.3 ms) may exist between the first panel and the second display panel. A variable refresh rate update (while Vsync is enabled) may occur which causes the frame rate to change from 60 FPS to 45 FPS. However, a delay in a refresh rate update of the first DPU 602 may cause the first skew 614 to drift to a second skew 616 (e.g., greater than or less than 8.3 ms). The second skew 616 may impact user experience.

Figure 7:
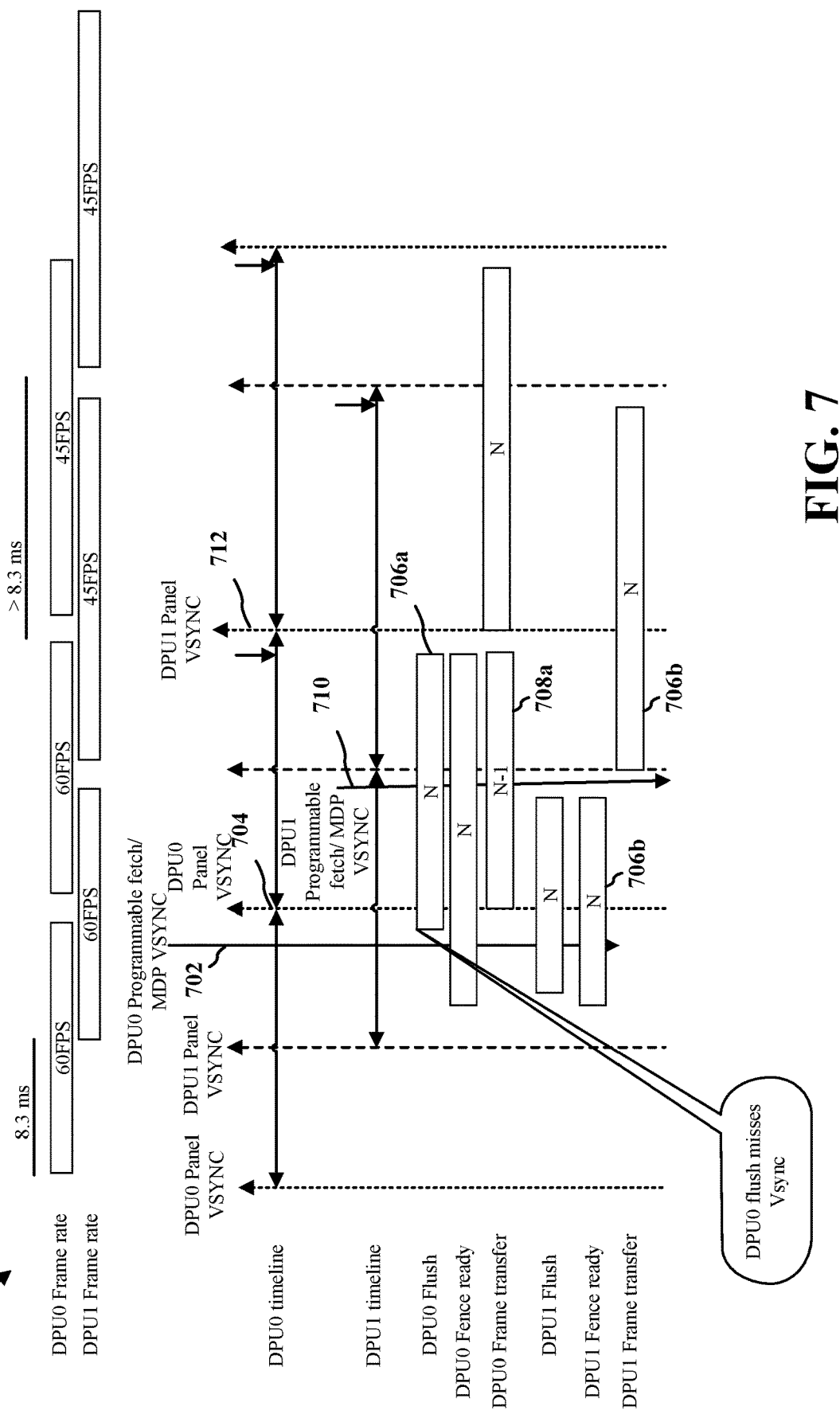
FIG. 7 is a diagram illustrating an example of a master flush delay causing a positive drift in skew in accordance with one or more techniques of this disclosure.

FIG. 7 is a diagram 700 illustrating an example of a master flush delay causing a positive drift in skew in accordance with one or more techniques of this disclosure. As discussed above, a display device (e.g., a VR headset) may skew display of frames between a left display panel and a right display panel of the display device. In an example, the skew may be 8.3 ms. However, when a variable refresh rate update occurs, the skew may drift due to an asynchronous flush. In an example, a flush may be a handshake between software (e.g., the first DPU software 606, the second DPU software 612) and hardware (e.g., the first DPU 602, the second DPU 608) to swap a doubled buffered register configuration. A flush may be associated with programmable register(s) which the software sets as a final flag to swap a register configuration. Upon a next Vsync, the hardware may swap the double buffered register configuration and auto-clear a flush flag associated with the flush. A flush may also be referred to as a flush operation. Double buffering may refer to the use of two buffers to hold data to increase processing speed. In an example with respect to double buffering, a first frame configuration may be written into a first buffer while hardware uses a second frame configuration in a second buffer for processing. When a swap occurs, the first frame configuration may be written into the second buffer, and a new frame configuration may be written into the first buffer. A flush may be available when the programmable register(s) associated with the flush have been fully configured such that the swap of the register configuration is able to be performed. The diagram 700 illustrates a master flush (i.e., a flush performed by a master DPU) causing a positive drift (i.e., an increase) in skew. Consuming a flush operation may refer to executing a handshake between software (e.g., the first DPU software 606, the second DPU software 612) and hardware (e.g., the first DPU 602, the second DPU 608) to swap a doubled buffered register configuration. Performing a flush operation may refer to executing a handshake between software (e.g., the first DPU software 606, the second DPU software 612) and hardware (e.g., the first DPU 602, the second DPU 608) to swap a doubled buffered register configuration and executing additional processing to facilitate the handshake. Performing a flush operation may include consuming the flush operation.

In an example, at 702, a new frame may be started several lines before a DPU0 panel Vsync occurrence 704. With more particularity, a prefetch (referred to in FIG. 7 as "DPU0 Programmable fetch/mobile display processor (MDP) VSYNC") may occur at 702. However, a flush with respect to an Nth frame 706a may not be available at 702, that is, at 702, software may still be configuring registers for the Nth frame 706a at 702, where the Nth frame 706a is to be displayed on a first display panel associated with a first DPU (referred to in FIG. 7 as "DPU0"). A fence may be available for the Nth frame 706a at 702. A fence being available may refer to a CPU and/or a GPU having completed processing operations on a frame in order for the frame to be displayed. As the flush is not available with respect to the Nth frame 706a at 702, an N-1 frame 708a (i.e., a previously displayed frame) may be transferred to the first display panel associated with the first DPU at the DPU0 panel Vsync occurrence 704. However, a flush with respect to an Nth frame 706b may be available at a prefetch occurring at 710, where the Nth frame 706b is to be displayed on a second display panel associated with a second DPU (referred to in FIG. 7 as "DPU1"). As a result, the Nth frame 706b may be transferred to a second display panel associated with a second DPU at a DPU1 panel Vsync occurrence 712. Transferring the N-1 frame 708a to the first display panel and transferring the Nth frame 706b to the second display panel may cause a positive drift in skew to occur, that is, the skew may increase from 8.3 ms to a value greater than 8.3 ms. As noted above, drift in skew may impact user experience.

Figure 8:
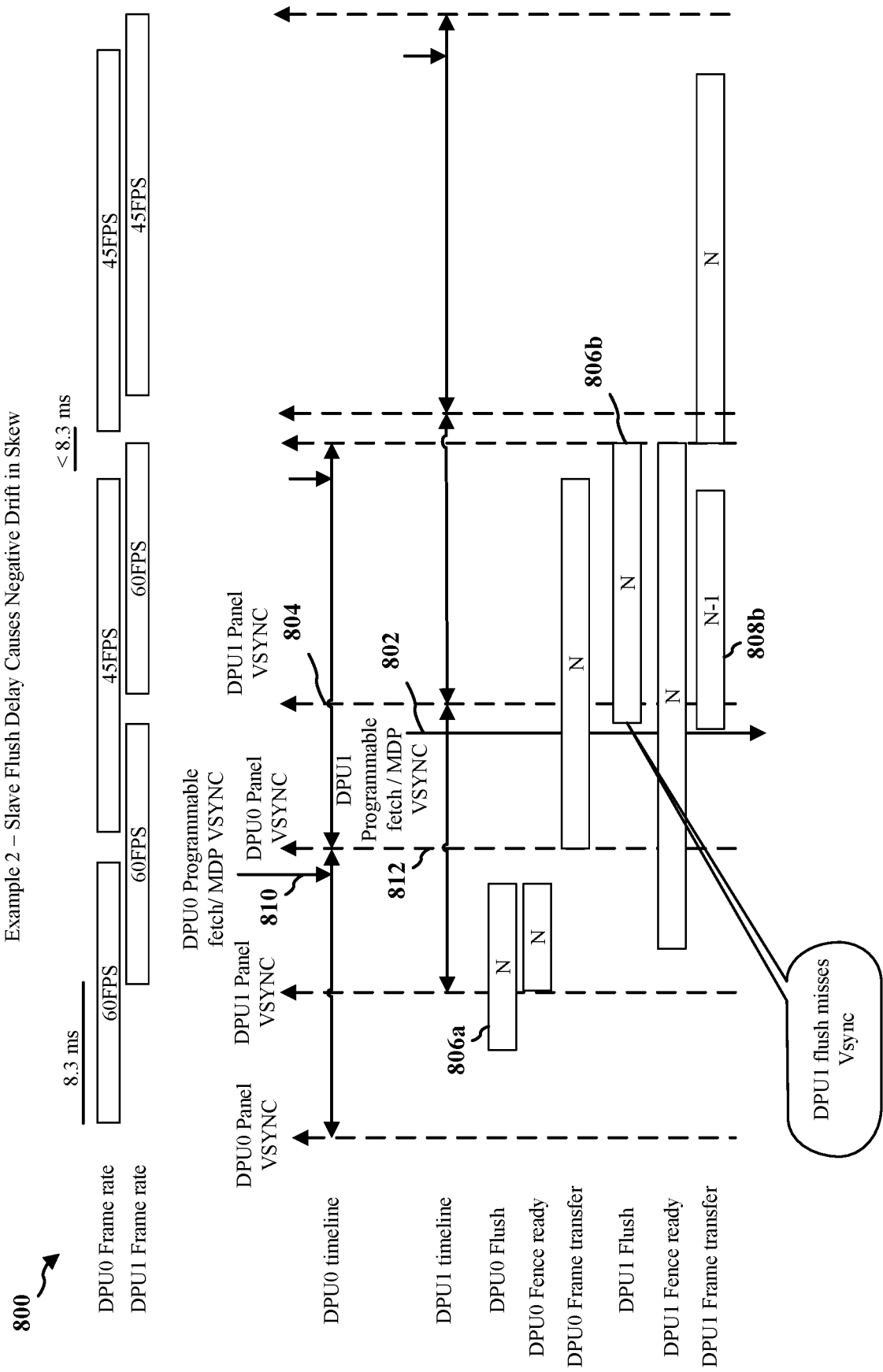
FIG. 8 is a diagram illustrating an example of a slave flush delay causing a negative drift in skew in accordance with one or more techniques of this disclosure.

FIG. 8 is a diagram 800 illustrating an example of a slave flush delay causing a negative drift in skew in accordance with one or more techniques of this disclosure. In an example, at 802, a new frame may be started several lines before a DPU1 panel Vsync occurrence 804. With more particularity, a prefetch (referred to in FIG. 7 as "DPU1 Programmable fetch/MDP VSYNC") may occur at 802. However, a flush with respect to a Nth frame 806b may not be available at 802, that is, at 802, software may still be configuring registers for the Nth frame 806b, where the Nth frame 806b is to be displayed on a second display panel associated with a second DPU (referred to in FIG. 8 as "DPU1"). A fence may be available for the Nth frame 806b at 802. As the flush is not available with respect to the Nth frame 806b at 802, an N-1 frame 808b (i.e., a previously displayed frame) may be transferred to the second display panel associated with the second DPU at the DPU1 panel Vsync occurrence 804. However, a flush with respect to a Nth frame 806a may be available at a prefetch occurring at 810, where the Nth frame 806a is to be displayed on a first display panel associated with a first DPU (referred to in FIG. 8 as "DPU0"). As a result, the Nth frame 806a may be transferred to a first display panel associated with a first DPU at a DPU0 panel Vsync occurrence 812. Transferring the Nth frame 806a to the first display panel and transferring the N-1 frame 808b to the second display panel may cause a negative drift in skew to occur, that is, the skew may decrease from 8.3 ms to a value less than 8.3 ms. As noted above, drift in skew may impact user experience.

Figure 9:
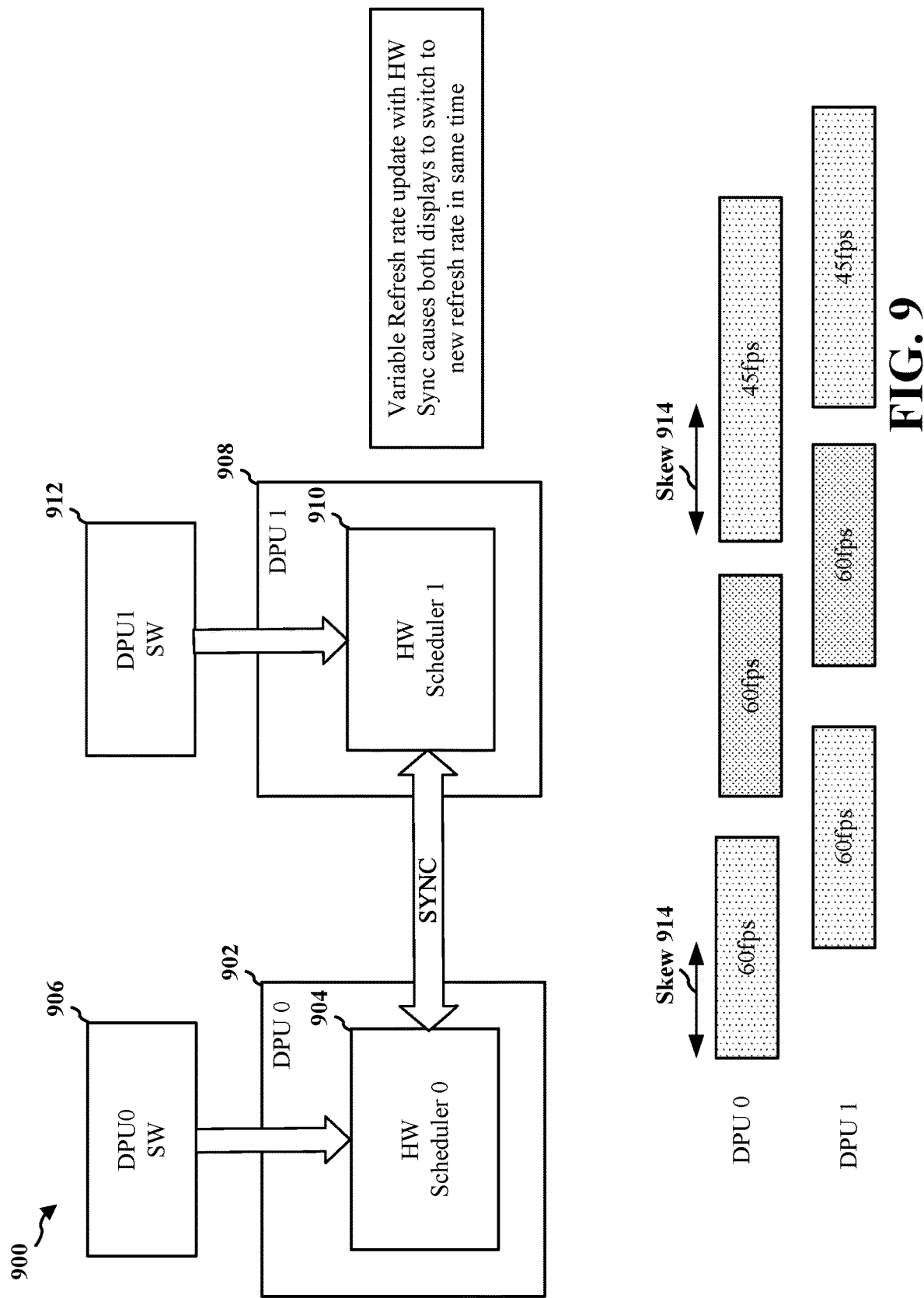
FIG. 9 is a diagram illustrating example aspects of variable refresh rate updates with hardware synchronization in accordance with one or more techniques of this disclosure.

FIG. 9 is a diagram 900 illustrating example aspects of variable refresh rate updates with hardware synchronization in accordance with one or more techniques of this disclosure. An extended reality (XR) headset (e.g., a virtual reality (VR) headset, an augmented reality (AR) headset, or a mixed reality (MR) headset) may include a first display panel and a second display panel, where the first display panel may display frames that are intended to be viewed by a first eye (e.g., a left eye) of a user wearing the headset and where the second display panel may display frames that are intended to be viewed by a second eye (e.g., a right eye) of the user wearing the headset. The first display panel (e.g., the first display 406A) may be driven by a first DPU (e.g., the first DPU 410A) and the second display panel (e.g., the second display 406B) may be driven by a second DPU (e.g., the second DPU 410B).

In an example, a first display panel (e.g., the first display 406A) of a display device (e.g., the wearable headset 408, an XR headset, etc.) may be driven by a first DPU 902 (referred to in FIG. 9 as "DPU 0"). The first DPU 902 may include a first hardware scheduler 904 (referred to in FIG. 9 as "HW scheduler 0"), where the first hardware scheduler 904 may be responsible for performing actions pertaining to scheduling the display of frames on the first display panel. The display device may include first DPU software 906 (referred to in FIG. 9 as "DPU0 SW") that may communicate with the first hardware scheduler 904 in order to facilitate the display of frames on the first display panel. Likewise, a second display panel (e.g., the second display 406B) of the display device may be driven by a second DPU 908 (referred to in FIG. 9 as "DPU 1"). The second DPU 908 may include a second hardware scheduler 910 (referred to in FIG. 9 as "HW scheduler 1"), where the second hardware scheduler 910 may be responsible for performing actions pertaining to scheduling the display of frames on the second display panel. The display device may include second DPU software 912 (referred to in FIG. 9 as "DPU1 SW") that may communicate with the second hardware scheduler 910 in order to facilitate the display of frames on the second display panel. The first hardware scheduler 904 and the second hardware scheduler 910 may synchronize with one another in order to facilitate the presentation of frames on the first display panel and the second display panel. For instance, by synchronizing with one another, the first hardware scheduler 904 and the second hardware scheduler 910 may help to ensure that a first frame is displayed on the first display panel and a second frame is displayed on the second display panel such that the first frame and the second frame form a coherent image to a user. In an example, the first frame may display a left half of an object at a point in time and the second frame may display a right half of the object at the point in time. Via synchronization, the user may see both the left half of the object (via a left eye) and the right half of the object (via a right eye) at the same time. Unlike software synchronization, hardware synchronization may cause both the first display panel and the second display panel to switch to a new refresh rate at the same time. Via the hardware synchronization between the first hardware scheduler 904 and the second hardware scheduler 910, a drift in skew 914 may be prevented or mitigated, that is, when a variable refresh rate update occurs, a value of the skew 914 may remain constant.

Various technologies pertaining to a synchronized dual eye variable refresh rate update for a VR display are disclosed herein. In one aspect, master software (SW) and slave SW may work independently on their respective vertical synchronizations (VSyncs). A flush may be independent for the master SW and the slave SW and internal hardware may synchronize a flush between a master DPU core and a slave DPU core, where a flush may be a handshake between SW and hardware (HW) to swap a double buffered register configuration. A flush may be associated with programmable register(s) which SW may set as a final flag to swap a register configuration, and upon a next VSync, HW may swap double buffered register configurations and auto-clear a flush flag. In another aspect, synchronized flush for a variable refresh rate (VRR) update with a skewed display may occur.

Synchronization may be supported between two DPU cores or between two operations of the same DPU. As used herein, the term "operation" (which may be abbreviated as OP0, OP1, etc.) may refer to fetching data from a buffer, processing the data, and providing the data to a display panel. Stated differently, synchronization may be supported between OP0 (i.e., controllers of DPU cores) or between OP0 and OP1 (i.e., controllers) of the same DPU core. Synchronization may introduce a 1 frame delay, based on a time instance at which a flush occurs. In one aspect, an asynchronous flush may be utilized for other use cases that are sensitive to latency. In one aspect, dynamic switching between asynchronous and synchronous flushes may occur.

Figure 10:
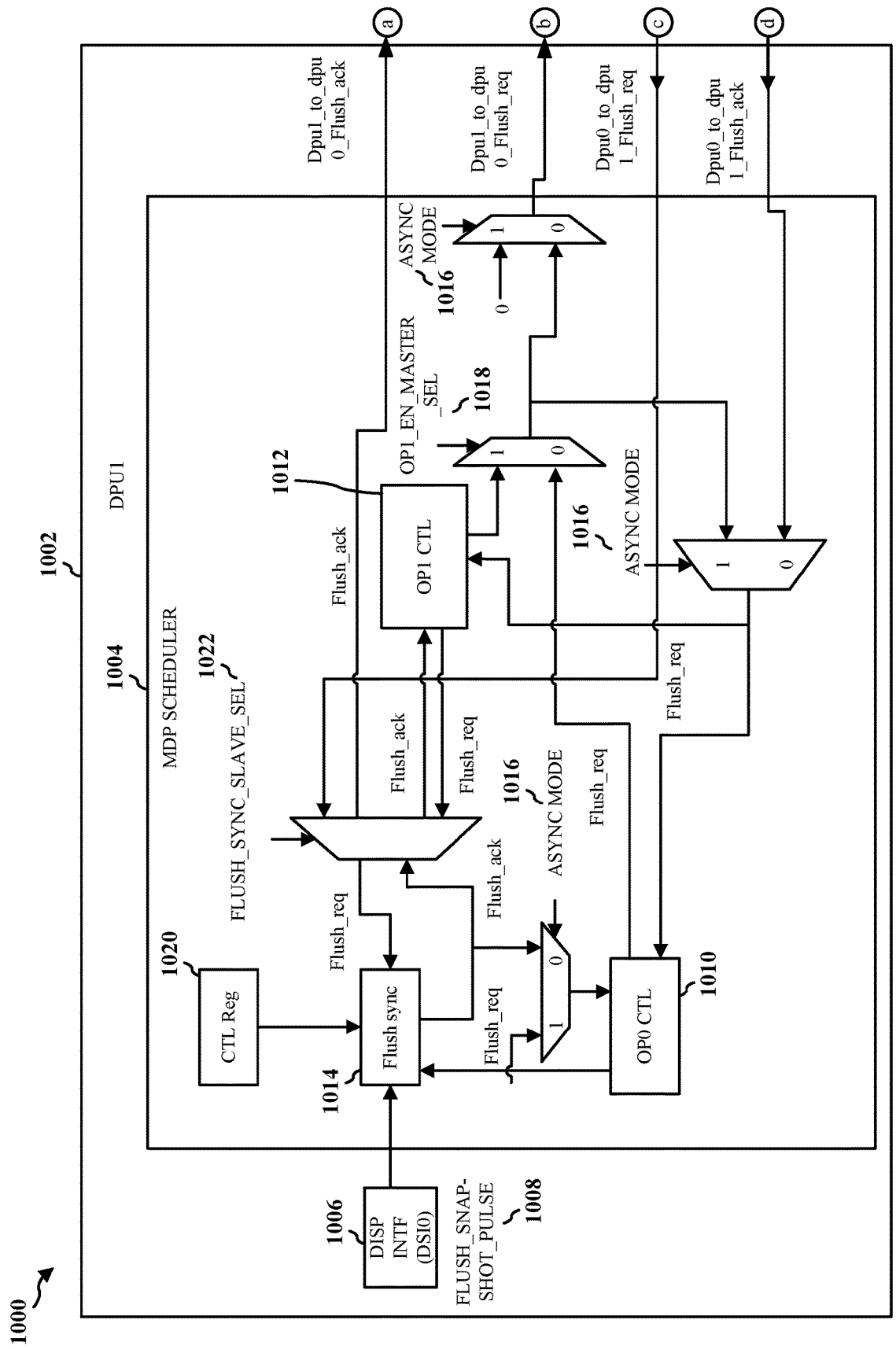
FIG. 10 is a diagram illustrating an example of a slave DPU in accordance with one or more techniques of this disclosure.
Figure 11:
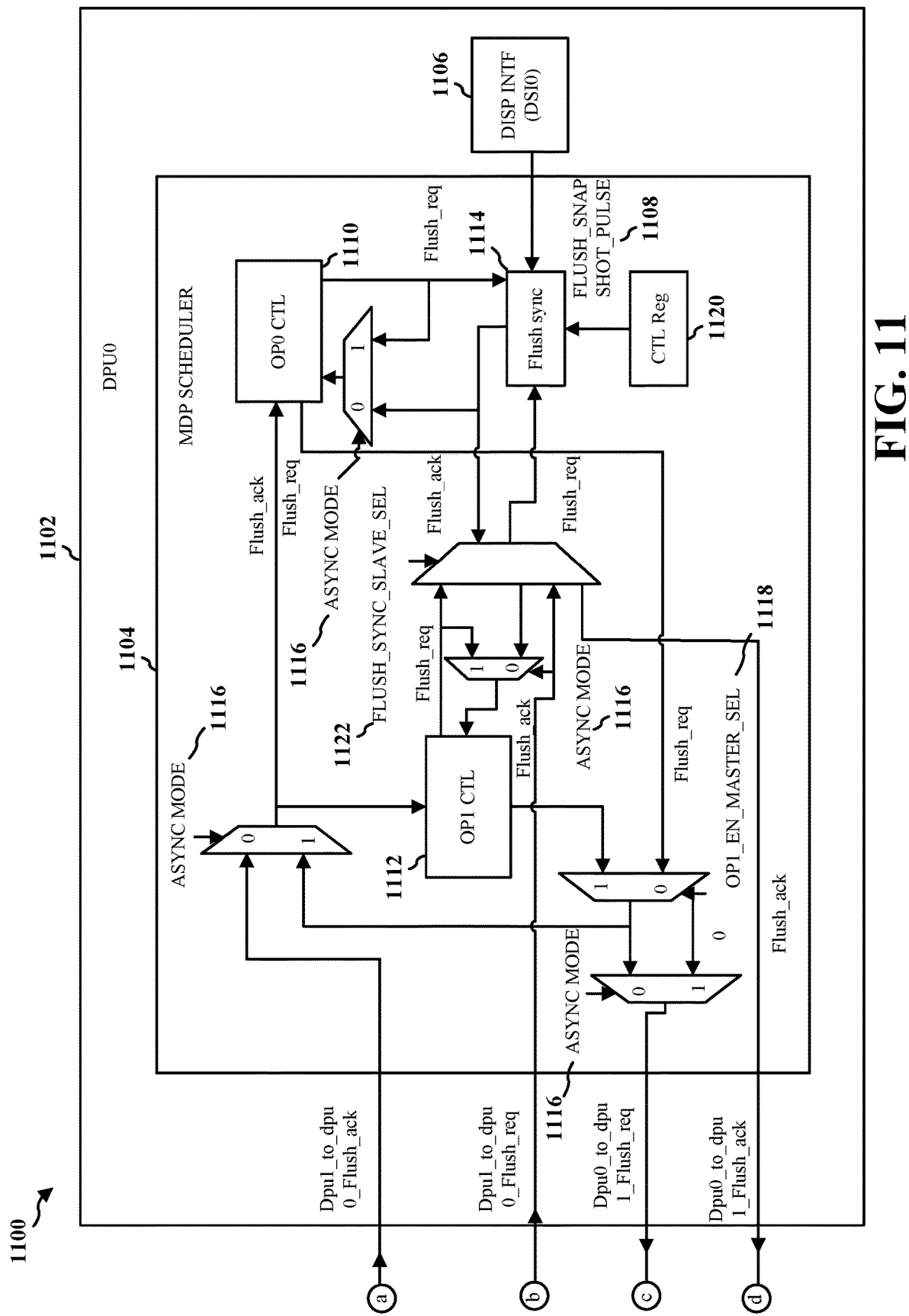
FIG. 11 is a diagram illustrating an example of a master DPU in accordance with one or more techniques of this disclosure.

FIG. 10 is a diagram 1000 illustrating an example of a slave DPU 1002 in accordance with one or more techniques of this disclosure. FIG. 11 is a diagram 1100 illustrating an example of a master DPU 1102 in accordance with one or more techniques of this disclosure. The slave DPU 1002 and the master DPU 1102 may communicate with one another in order to facilitate the display of frames on a first display panel and a second display panel. In an example, the slave DPU 1002 may be or include the second DPU 410B or the second DPU 908. In an example, the master DPU 1102 may be or include the first DPU 410A or the first DPU 902. In some configurations, the role of the slave DPU 1002 and the master DPU 1102 may be reversed, that is, the slave DPU 1002 may become a master DPU and the master DPU 1102 may become a slave DPU.

Referring now to FIG. 10, the slave DPU 1002 may include a MDP scheduler 1004 and a timing engine generator 1006 (referred to in FIG. 10 as DISP INTF (DSIO)). The timing engine generator 1006 may be configured to generate timings (e.g., Vsync pulses). The timing engine generator 1006 may also be configured to generate a flush snapshot pulse 1008 (referred to in FIG. 10 as "FLUSH_SNAPSHOT_PULSE"). The flush snapshot pulse 1008 may be defined as a pulse with a software configurable duration occurring before a Vsync instance. The flush snapshot pulse 1008 may also occur before a prefetch (i.e., before DPU1 programmable fetch/MDP VSync).

The MDP scheduler 1004 may be or include the second hardware scheduler 910. The MDP scheduler 1004 may include a first operation controller 1010 (referred to in FIG. 10 as "OP0 CTL") and a second operation controller 1012 (referred to in FIG. 10 as "OP1 CTL"). The first operation controller 1010 may be configured to fetch data (e.g., a frame) from a buffer, process the data, and provide the data to a first display panel for display on the first display panel. The second operation controller 1012 may be configured to fetch data from a buffer, process the data, and provide data to a second display panel for display on the second display panel. Depending on a configuration of the slave DPU 1002, both the first operation controller 1010 and the second operation controller 1012 may be enabled, one of the first operation controller 1010 or the second operation controller 1012 may be enabled, or both the first operation controller 1010 and the second operation controller 1012 may be disabled.

The MDP scheduler 1004 may include flush synchronization logic 1014 (referred to in FIG. 10 as "Flush sync"). The flush synchronization logic 1014 may coordinate flush operations within the slave DPU 1002 and/or with the master DPU 1102. The MDP scheduler 1004 may include synchronization mode registers 1016 (referred to in FIG. 10 as "ASYNC MODE"). The synchronization mode registers 1016 may include a bit, where a value of the bit may indicate whether a synchronous flush is to be performed or an asynchronous flush is to be performed by the slave DPU 1002. The MDP scheduler 1004 may include a master selection register 1018 (referred to in FIG. 10 as "OP1_EN_MASTER_SEL"). The master selection register 1018 may include a bit, where a value of the bit may indicate whether synchronization is to occur within a DPU (e.g., synchronization between the first operation controller 1010 and the second operation controller 1012) or between DPUs (e.g., between the slave DPU 1002 and the master DPU 1102).

The MDP scheduler 1004 may include a control register 1020 (referred to in FIG. 10 as "CTL Reg"). The control register 1020 may refer to a module where configuration registers for a particular display controller are located. The MDP scheduler 1004 may include a flush synchronization slave selection register 1022 (referred to in FIG. 10 as "FLUSH_SYNC_SLAVE_SEL"). The flush synchronization slave selection register 1022 may be configured to enable slave DPU functionality (and hence disable master DPU functionality) or enable master DPU functionality (and hence disable slave DPU functionality).

Referring now to FIG. 11, the master DPU 1102 may include a MDP scheduler 1104 and a timing engine generator 1106 (referred to in FIG. 11 as "DISP INTF (DSIO)"). The timing engine generator 1106 may be configured to generate timings (e.g., Vsync pulses). The timing engine generator 1106 may also be configured to generate a flush snapshot pulse 1108 (referred to in FIG. 11 as "FLUSH_SNAPSHOT_PULSE"). The flush snapshot pulse 1108 may be defined as a pulse with a software configurable duration occurring before a Vsync instance. The flush snapshot pulse 1108 may also occur before a prefetch (i.e., before DPU0 programmable fetch/MDP VSync).

The MDP scheduler 1104 may be or include the second hardware scheduler 910. The MDP scheduler 1104 may include a first operation controller 1110 (referred to in FIG. 11 as "OP0 CTL") and a second operation controller 1112 (referred to in FIG. 11 as "OP1 CTL"). The first operation controller 1110 may be configured to fetch data (e.g., a frame) from a buffer, process the data, and provide the data to a first display panel for display on the first display panel. The second operation controller 1112 may be configured to fetch data from a buffer, process the data, and provide data to a second display panel for display on the second display panel. Depending on a configuration of the slave DPU 1002, both the first operation controller 1110 and the second operation controller 1112 may be enabled, one of the first operation controller 1110 or the second operation controller 1112 may be enabled, or both the first operation controller 1110 and the second operation controller 1112 may be disabled.

The MDP scheduler 1104 may include flush synchronization logic 1114 (referred to in FIG. 11 as "Flush sync"). The flush synchronization logic 1114 may coordinate flush operations within the slave DPU 1002 and/or with the master DPU 1102. The MDP scheduler 1104 may include synchronization mode registers 1116 (referred to in FIG. 11 as "ASYNC MODE"). The synchronization mode registers 1116 may include a bit, where a value of the bit may indicate whether a synchronous flush is to be performed or an asynchronous flush is to be performed by the master DPU 1102. The MDP scheduler 1104 may include a master selection register 1118 (referred to in FIG. 11 as "OP1_EN_MASTER_SEL"). The master selection register 1118 may include a bit, where a value of the bit may indicate whether synchronization is to occur within a DPU (e.g., synchronization between the first operation controller 1110 and the second operation controller 1112) or between DPUs (e.g., between the slave DPU 1002 and the master DPU 1102).

The MDP scheduler 1104 may include a control register 1120 (referred to in FIG. 11 as "CTL Reg"). The control register 1120 may refer to a module where configuration registers for a particular display controller are located. The MDP scheduler 1104 may include a flush synchronization slave selection register 1122 (referred to in FIG. 11 as "FLUSH_SYNC_SLAVE_SEL"). The flush synchronization slave selection register 1122 may be configured to enable slave DPU functionality (and hence disable master DPU functionality) or enable master DPU functionality (and hence disable slave DPU functionality).

Referring now jointly to FIGS. 10 and 11, the flush synchronization logic 1014 may be configured to receive a flush snapshot from the timing engine generator 1006. The flush synchronization logic 1014 may be configured to receive a flush request (i.e., "flush_req" in FIG. 10) from the first operation controller 1010 and/or the second operation controller 1012. The flush synchronization logic 1014 may be configured to transmit a flush acknowledgment (i.e., "flush_ack" in FIG. 10) to the first operation controller 1010 and/or the second operation controller 1012. The flush synchronization logic 1014 may be configured to transmit a flush request (i.e., "Dpu1_to_dpu0_Flush_req" in FIG. 10) to the first operation controller 1110 and/or the second operation controller 1112 of the master DPU 1102. The flush synchronization logic 1014 may be configured to transmit a flush acknowledgment (i.e., "Dpu1_to_dpu0_Flush_ack" in FIG. 10) to the first operation controller 1110 and/or the second operation controller 1112 of the master DPU 1102. The flush synchronization logic 1014 may be configured to receive a flush request (i.e., "Dpu0_to_dpu1_Flush_req" in FIG. 10) from the first operation controller 1110 and/or the second operation controller 1112 of the master DPU 1102. The flush synchronization logic 1014 may be configured to receive a flush acknowledgment (i.e., "Dpu0_to_dpu1_Flush_ack" in FIG. 10) from the first operation controller 1110 and/or the second operation controller 1112 of the master DPU 1102.

The flush synchronization logic 1114 may be configured to receive a flush snapshot from the timing engine generator 1106. The flush synchronization logic 1114 may be configured to receive a flush request (i.e., "flush_req" in FIG. 11) from the first operation controller 1110 and/or the second operation controller 1112. The flush synchronization logic 1114 may be configured to transmit a flush acknowledgment (i.e., "flush_ack" in FIG. 11) to the first operation controller 1110 and/or the second operation controller 1112. The flush synchronization logic 1114 may be configured to transmit a flush request (i.e., "Dpu0_to_dpu1_Flush_req" in FIG. 11) to the first operation controller 1010 and/or the second operation controller 1012 of the slave DPU 1002. The flush synchronization logic 1114 may be configured to transmit a flush acknowledgment (i.e., "Dpu0_to_dpu1_Flush_ack" in FIG. 11) to the first operation controller 1010 and/or the second operation controller 1012 of the slave DPU 1002. The flush synchronization logic 1114 may be configured to receive a flush request (i.e., "Dpu1_to_dpu0_Flush_req" in FIG. 11) from the first operation controller 1010 and/or the second operation controller 1012 of the slave DPU 1002. The flush synchronization logic 1114 may be configured to receive a flush acknowledgment (i.e., "Dpu1_to_dpu0_Flush_ack" in FIG. 11) from the first operation controller 1010 and/or the second operation controller 1012 of the slave DPU 1002.

Figure 12:
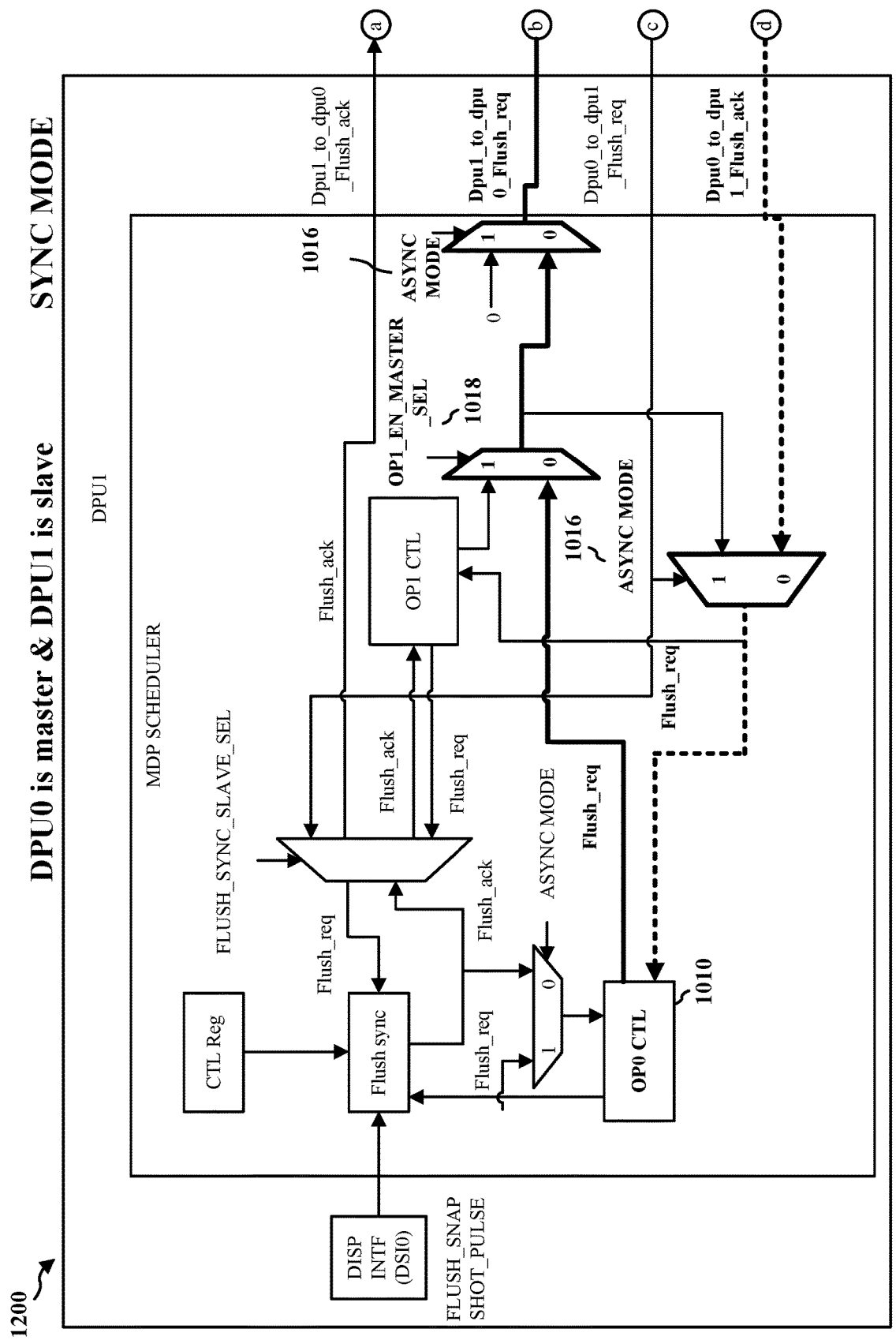
FIG. 12 is a diagram illustrating an example of a slave DPU operating in a synchronous (sync) mode in accordance with one or more techniques of this disclosure.
Figure 13:
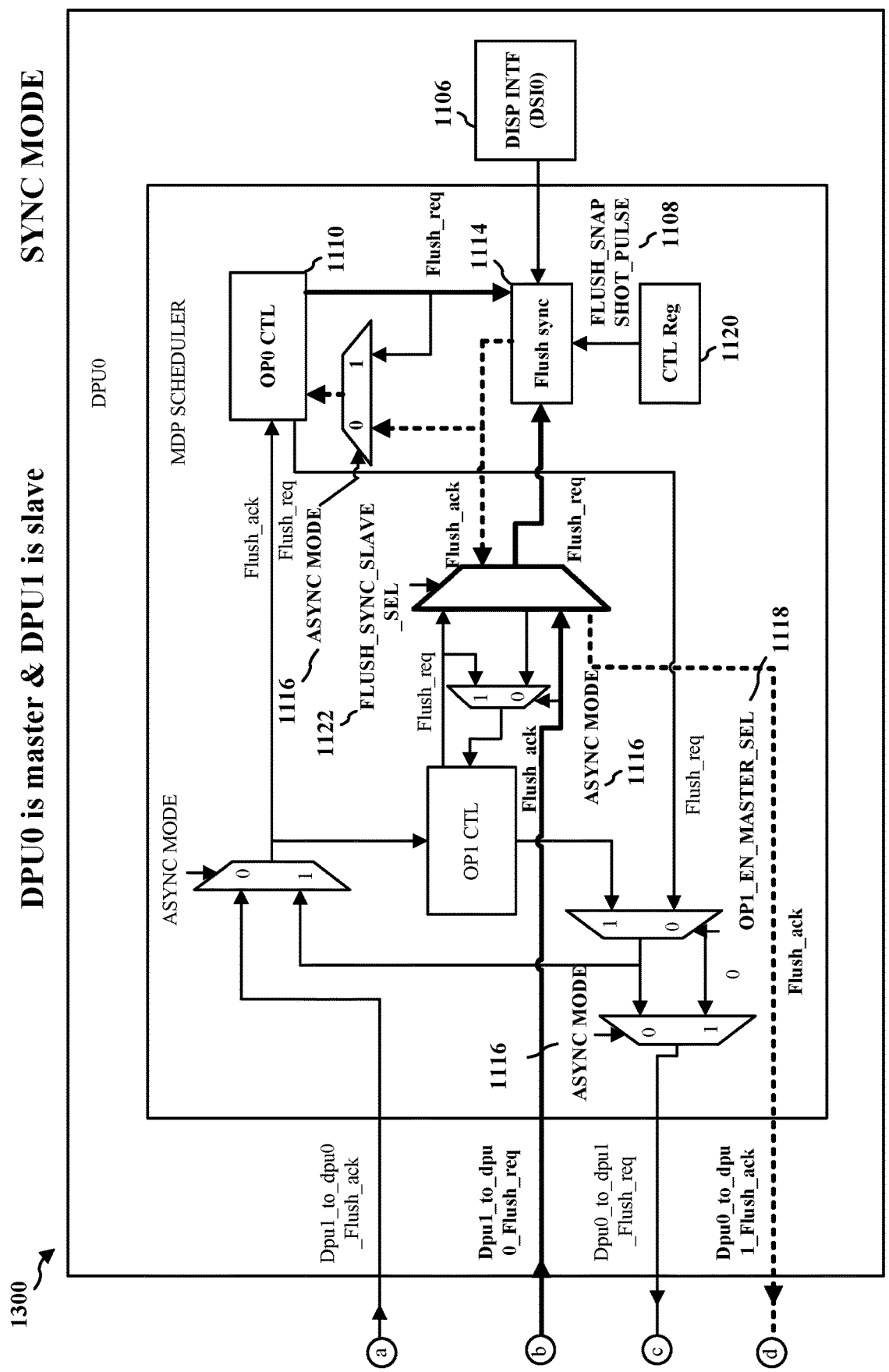
FIG. 13 is a diagram illustrating an example of a master DPU operating in a sync mode in accordance with one or more techniques of this disclosure.

FIG. 12 is a diagram 1200 illustrating an example of the slave DPU 1002 operating in a sync mode in accordance with one or more techniques of this disclosure. FIG. 13 is a diagram 1300 illustrating an example of a master DPU operating in a sync mode in accordance with one or more techniques of this disclosure. Referring jointly now to FIGS. 12 and 13, in one aspect, the master DPU 1102 and the slave DPU 1002 may operate in sync mode. When operating in sync mode, the master DPU 1102 may perform a first flush operation based on a Vsync instance and the slave DPU 1002 may perform a second flush operation at the Vsync instance when both the first flush operation and the second flush operation are available at a time instance occurring before the Vsync instance. In an example, if the second flush operation is unavailable at the time instance, the master DPU 1102 may wait to perform the first flush operation until a subsequent time instance when both the first flush operation and the second flush operation are available. The master DPU 1102 may repeat a previous frame until a time at which both the first flush operation and the second flush operation are available.

In an example, the flush synchronization logic 1114 may receive a flush snapshot generated by the timing engine generator 1106. The flush snapshot may be associated with the flush snapshot pulse 1108. The first operation controller 1110 may transmit a first flush request to the flush synchronization logic 1114. The first operation controller 1010 may transmit a second flush request to the flush synchronization logic 1114. The flush synchronization logic 1114 may transmit a first flush acknowledgment to the first operation controller 1010 and a second flush acknowledgment to the first operation controller 1110 based on receiving the first flush request and the second flush request. The first operation controller 1010 and the first operation controller 1110 may each consume a respective flush at a next Vsync instance.

Figure 14:
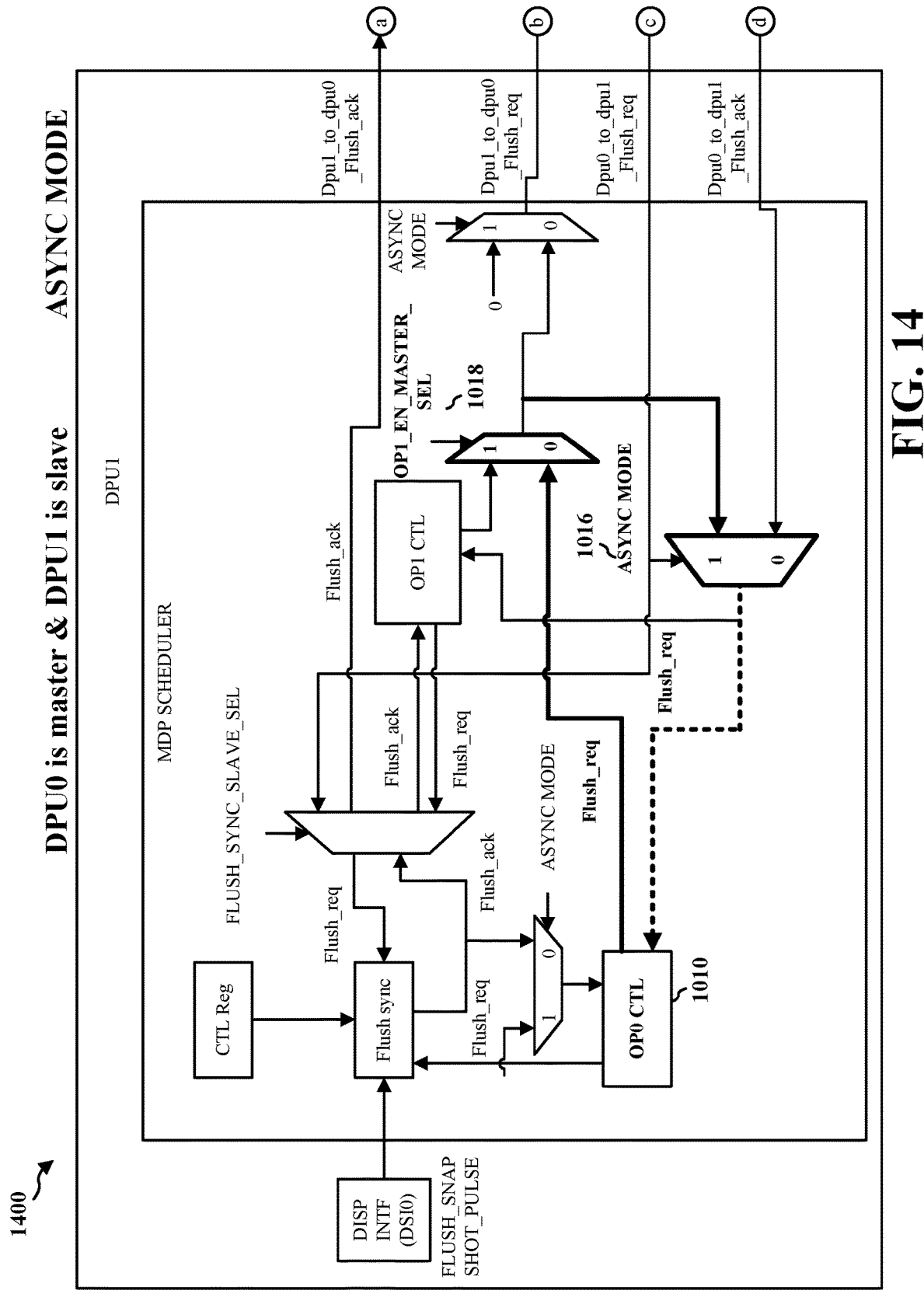
FIG. 14 is a diagram illustrating an example of a slave DPU operating in an asynchronous (async) mode in accordance with one or more techniques of this disclosure.
Figure 15:
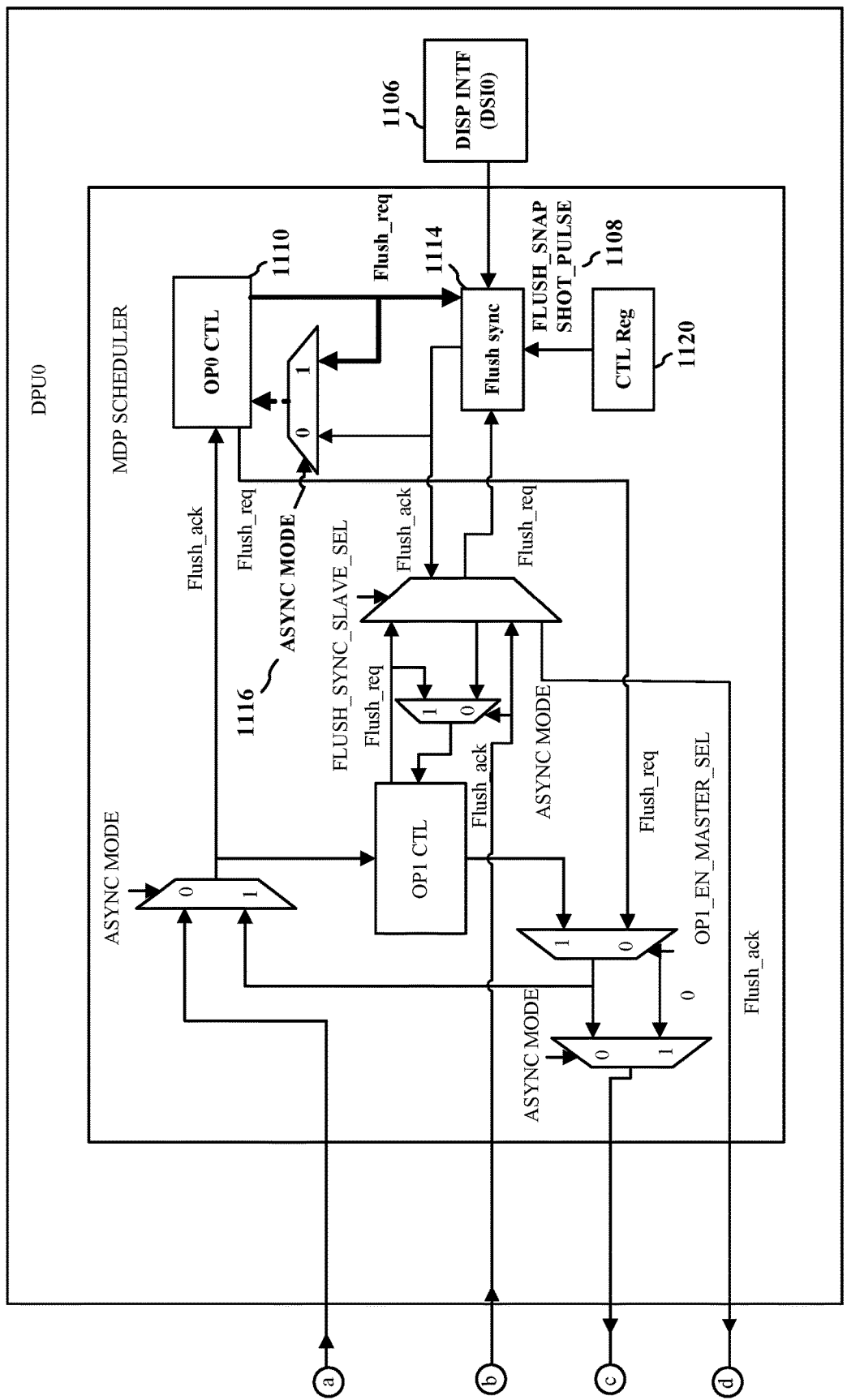
FIG. 15 is a diagram illustrating an example of a master DPU operating in an async mode in accordance with one or more techniques of this disclosure.

FIG. 14 is a diagram 1400 illustrating an example of a slave DPU operating in an async mode in accordance with one or more techniques of this disclosure. FIG. 15 is a diagram 1500 illustrating an example of a master DPU operating in an async mode in accordance with one or more techniques of this disclosure. Referring jointly now to FIGS. 14 and 15, in one aspect, the master DPU 1102 and the slave DPU 1002 may operate in async mode. When operating in async mode, the first operation controller 1110 of the master DPU 1102 may consume a first flush at a first VSync instance when the first operation controller 1110 of the master DPU 1102 receives a first indication of a software flush from software associated with the master DPU 1102 (e.g., the first DPU software 906) and the first operation controller 1010 of the slave DPU 1002 may consume a second flush at a second Vsync instance when the first operation controller 1010 of the slave DPU 1002 receives a second indication of a software flush from software associated with the slave DPU 1002 (e.g., the second DPU software 912). The first VSync instance and the second VSync instance may be the same or different. Stated differently, the first VSync instance and the second VSync instance may both be a next available VSync instance for the master DPU 1102 and the slave DPU 1002, or the first VSync instance be a next available Vsync instance for the master DPU 1102 and the second VSync instance may be a VSync instance occurring after a next available VSync instance for the slave DPU 1002. Thus, when operating in async mode, the master DPU 1102 and the slave DPU 1002 may consume flush(es) independently of one another. For example, the master DPU 1102 may consume a first flush at a next available VSync instance of the master DPU 1102 even if a second flush is not available for the slave DPU 1002 at a next VSync instance for the slave DPU 1002.

Figure 16:
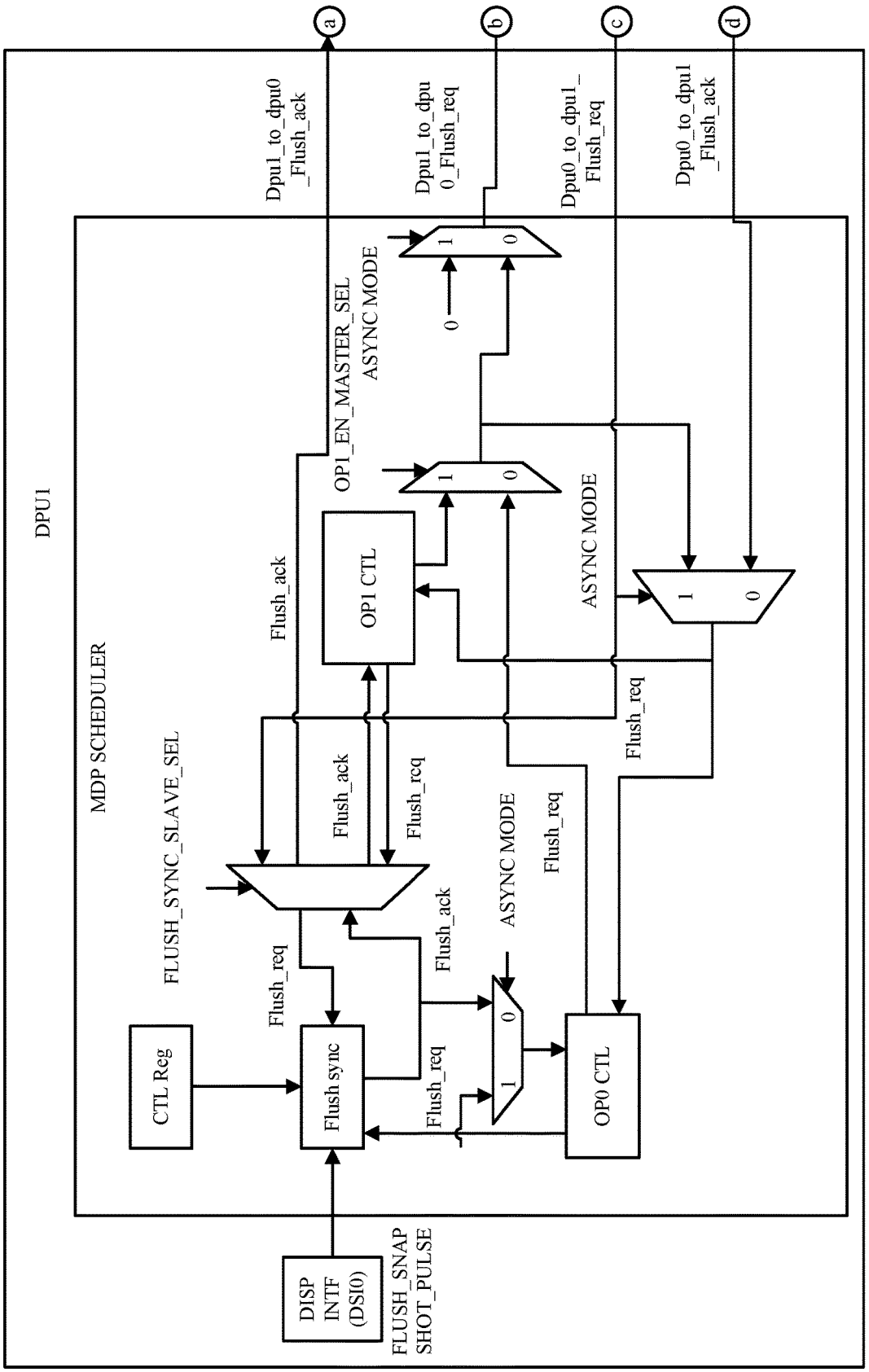
FIG. 16 is a diagram illustrating an example of a slave DPU in a power-collapsed state in a sync mode in accordance with one or more techniques of this disclosure.
Figure 17:
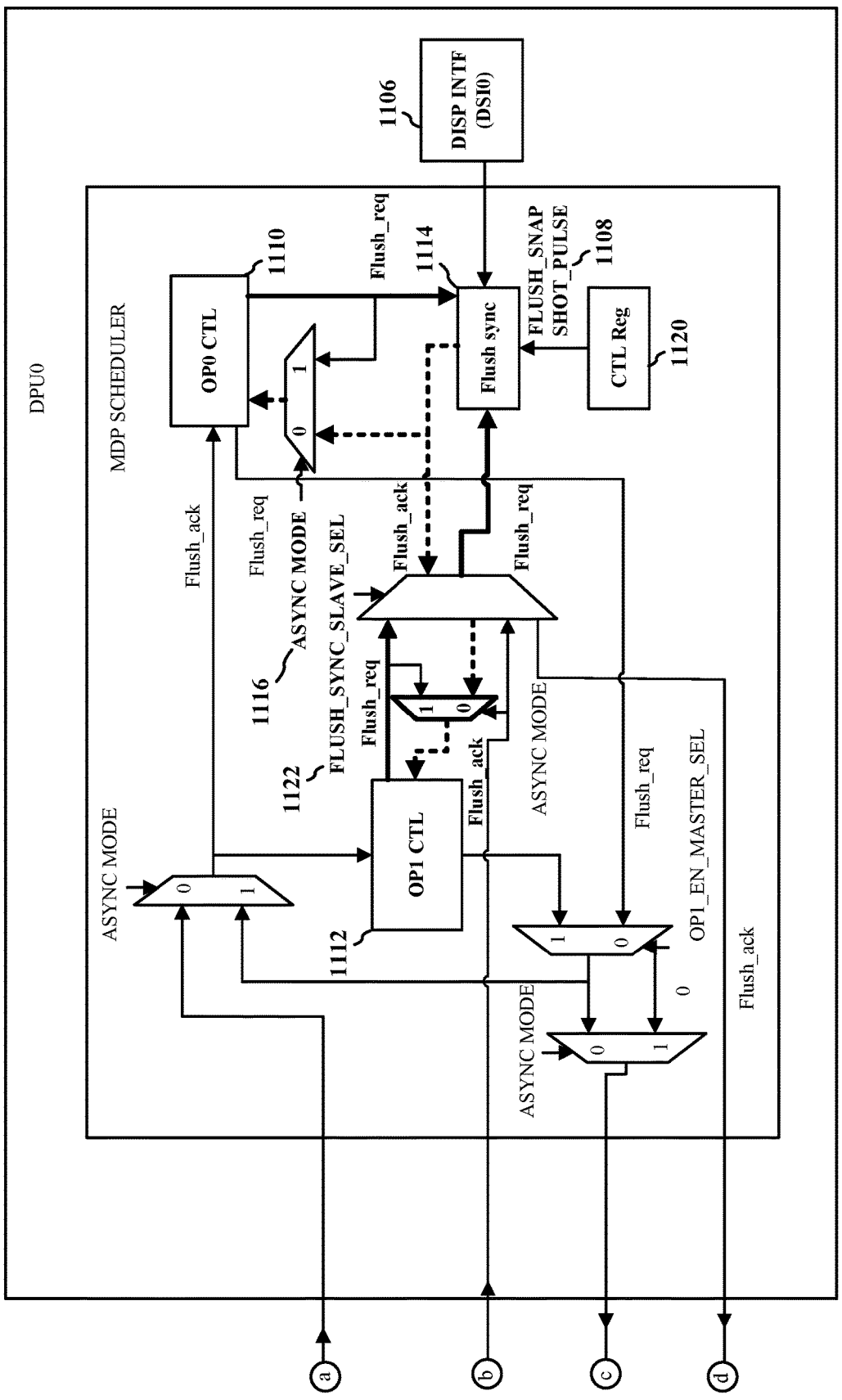
FIG. 17 is a diagram illustrating an example of a master DPU in a sync mode while a slave DPU is in a power-collapsed state in accordance with one or more techniques of this disclosure.

FIG. 16 is a diagram 1600 illustrating an example of a slave DPU in a power-collapsed state in a sync mode in accordance with one or more techniques of this disclosure. FIG. 17 is a diagram 1700 illustrating an example of a master DPU in a sync mode while a slave DPU is in a power-collapsed state in accordance with one or more techniques of this disclosure. Referring jointly now to FIGS. 16 and 17, the master DPU 1102 may operate in sync mode and the slave DPU 1002 may be in a power-collapsed state. When the master DPU 1102 operates in the sync mode and the slave DPU 1002 is in a power collapsed state, the first operation controller 1110 of the master DPU 1102 may perform master DPU functionality and the second operation controller 1112 of the master DPU 1102 may perform slave DPU functionality.

In an example, the flush synchronization logic 1114 may receive a flush snapshot generated by the timing engine generator 1106. The flush snapshot may be associated with the flush snapshot pulse 1108. The first operation controller 1110 may transmit a first flush request to the flush synchronization logic 1114. The second operation controller 1112 may transmit a second flush request to the flush synchronization logic 1114. The flush synchronization logic 1114 may transmit a first flush acknowledgment to the first operation controller 1110 and a second flush acknowledgment to the second operation controller 1112 based on receiving the first flush request and the second flush request. The first operation controller 1110 and the second operation controller 1112 may each consume a respective flush at a next available Vsync instance for the first operation controller 1110 and the second operation controller 1112, respectively.

Figure 18:
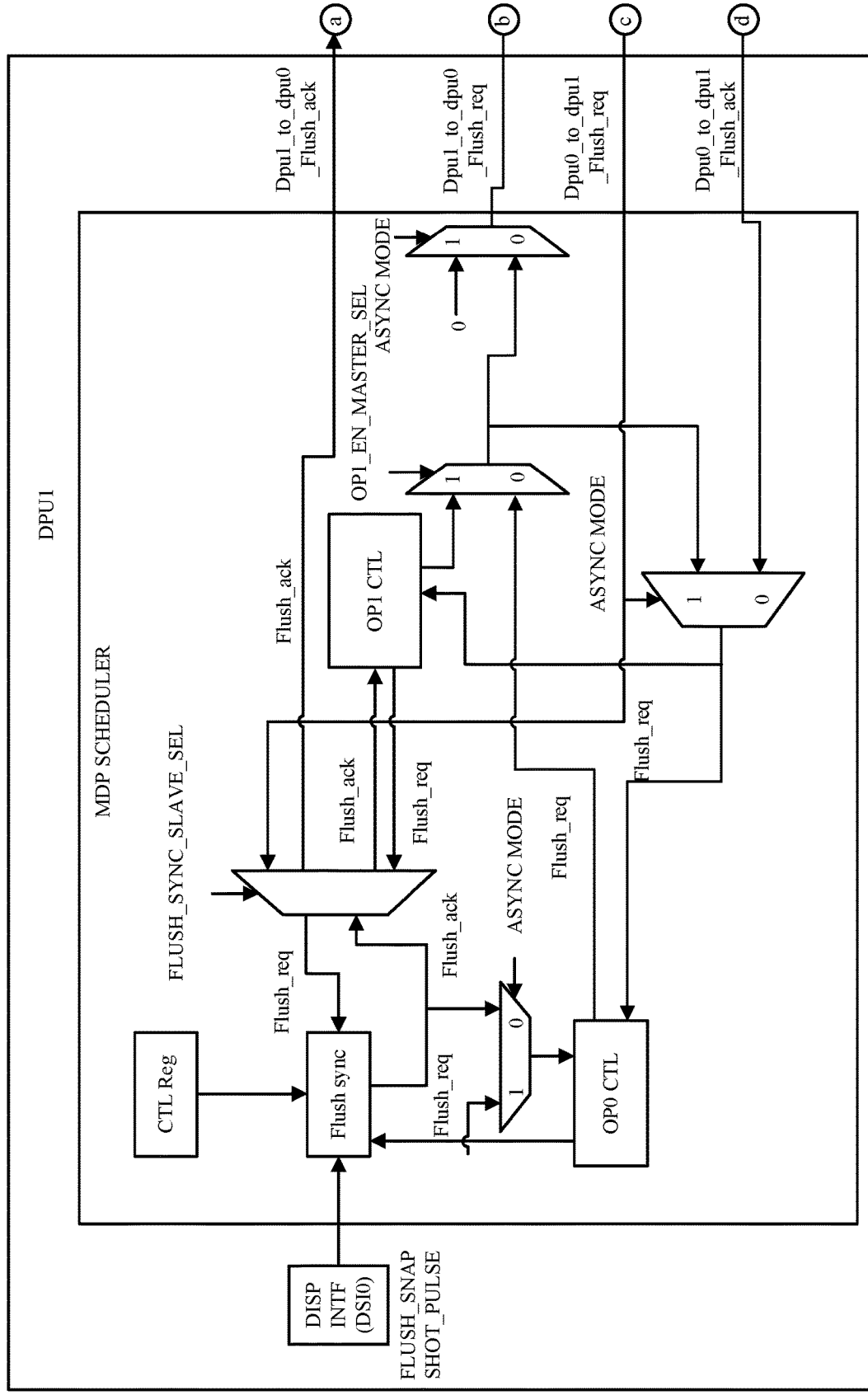
FIG. 18 is a diagram illustrating an example of a slave DPU in a power-collapsed state in an async mode in accordance with one or more techniques of this disclosure.
Figure 19:
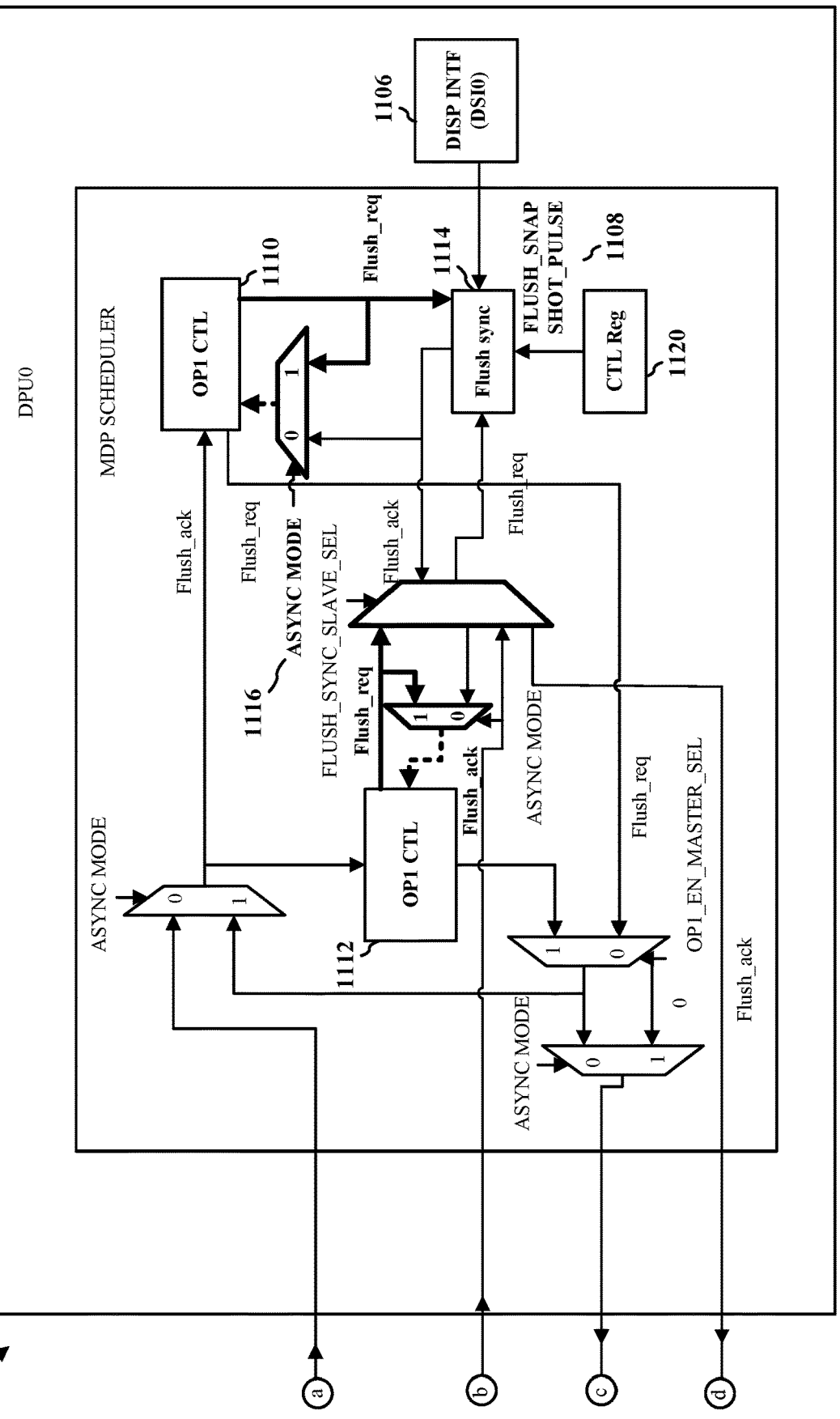
FIG. 19 is a diagram illustrating an example of a master DPU in an async mode while a slave DPU is in a power-collapsed state in accordance with one or more techniques of this disclosure.

FIG. 18 is a diagram 1800 illustrating an example of a slave DPU in a power-collapsed state in an async mode in accordance with one or more techniques of this disclosure. FIG. 19 is a diagram 1900 illustrating an example of a master DPU in an async mode while a slave DPU is in a power-collapsed state in accordance with one or more techniques of this disclosure. Referring jointly now to FIGS. 18 and 19, the master DPU 1102 may operate in async mode and the slave DPU 1002 may be in a power-collapsed state. When the master DPU 1102 operates in the async mode and the slave DPU 1002 is in a power collapsed state, the first operation controller 1110 of the master DPU 1102 may perform master DPU functionality and the second operation controller 1112 of the master DPU 1102 may perform slave DPU functionality. When operating in async mode, the first operation controller 1110 of the master DPU 1102 may consume a first flush at a first VSync instance when the first operation controller 1110 of the master DPU 1102 receives a first indication of a software flush from software associated with the master DPU 1102 (e.g., the first DPU software 906) and the second operation controller 1112 of the master DPU 1102 may consume a second flush at a second Vsync instance when the second operation controller 1112 of the master DPU 1102 receives a second indication of a software flush from the software associated with the master DPU 1102 (e.g., the first DPU software 906).

Table 1 below details aspects pertaining to a flush synchronization register ("FLUSH_SYNC"). Table 2 below details aspects pertaining to a flush synchronization mode register ("FLUSH_SYNC_MODE"). Table 3 below details aspects pertaining to a flush snapshot register ("FLUSH_SNAPSHOT"). Table 4 below details aspects pertaining to an interface configuration register ("INTF CONFIG"). Tables 1-4 include details pertaining to flush synchronization configuration registers and sequences.

TABLE 1

FLUSH_SYNC
Register Name: FLUSH_SYNC
Register Space: CTL Space
Register Type: Static; configured during power on

| Bits | Field | Functionality |
|------|-------|---------------|
| 0 | EN | Enable flush synchronization feature |
| 1 | MODE SEL | 0 Master<br>1 Slave |
| 2 | MASTER SLAVE SEL | If MODE SEL is (0x0) (Master)<br>- 0: Slave OP is within same DPU core (synchronization is within same DPU core)<br>- 1: Slave OP is another DPU core's OP0 (synchronization is between DPU cores)<br>If MODE SEL is 0x1 (Slave)<br>- 0: Master OP is within same DPU core<br>- 1: Master OP is another DPU core's OP0 |

TABLE 2

FLUSH_SYNC_MODE
Register Name: FLUSH_SYNC_MODE
Register Space: CTL Space
Register Type: Configure before CTL flush; set by SW and clear by HW

| Bits | Field | Functionality |
|------|-------|---------------|
| 0 | SEL | 0 - sync mode<br>1 - async mode |

TABLE 2-continued

FLUSH_SYNC_MODE
Register Name: FLUSH_SYNC_MODE
Register Space: CTL Space
Register Type: Configure before CTL flush; set by SW and clear by HW

| Bits | Field | Functionality |
| --- | --- | --- |
| 1:31 | RESERVED | Writing "1" to this register will bypass flush synchronization for a next flush. HW will auto clear to 0x0 once flush is consumed |

TABLE 3

FLUSH_SNAPSHOT
Register Name: FLUSH_SNAPSHOT
Register Space: INTF Space
Register Type: Double buffered

| Bits | Field | Functionality |
| --- | --- | --- |
| 31:0 | VALUE | Valid if INTF_CONFIG_PROG_FLUSH_SNAPSHOT_EN is 0x1. VSync count at which snapshot is to be sampled for flush decision. |

TABLE 4

INTF CONFIG
Register Name: INTF CONFIG
Register Space: INTF Space
Register Type: Double buffered; Existing register. Added new field

| Bits | Field | Functionality |
| --- | --- | --- |
| 14 | PROG_FLUSH_SNAPSHOT_EN | Enable early snapshot for flush decision based on value |

With reference to Tables 1-4, a master DPU initialization procedure is now set forth. Flush synchronization may be enabled by the EN field of FLUSH_SYNC. A first DPU may be configured as a master DPU and a second DPU may be configured as a slave DPU via the MODE SEL field of FLUSH_SYNC. Additionally or alternatively, the PAIR SEL field of FLUSH_SYNC may be configured. Additional registers may then be configured. The VALUE field of FLUSH_SNAPSHOT (i.e., FLUSH_SNAPSHOT_EN/VALUE register) may be configured to indicate when a scheduler should snapshot a flush. The VALUE field of FLUSH_SNAPSHOT may be a minimum of ½ a line before a mobile display processor (MDP) VSync. A flush may be asserted via aysnc mode (e.g., when the SEL field of FLUSH_SYNC_MODE is 1). The (configured) master DPU may wait for slave DPU initialization. A timing engine may be enabled when a slave flush is complete. In the master DPU initialization, a flush master DPU may be the same as an INTF master.

With reference to Tables 1-4, a slave DPU initialization process is now set forth. The slave DPU initialization process may be for OP0 of s slave DPU or a slave OP (OP1) of DPU0). Flush synchronization may be enabled by the EN field of FLUSH_SYNC. The MODE SEL field of FLUSH_SYNC may be set as slave. PAIR SEL may also be configured. Additional registers may then be configured. A flush may be asserted via async mode (e.g., when the SEL field of FLUSH_SYNC_MODE is 1). In the slave DPU initialization, a flush master DPU may be the same as an INTF master.

With reference to Tables 1-4, a master and slave configuration for subsequent updates is now set forth. Registers may be configured. A flush may be asserted via the SEL field of FLUSH_SYNC_MODE (e.g., sync/async mode). For a master DPU, the VALUE field of FLUSH_SNAPSHOT (i.e., FLUSH_SNAPSHOT VALUE) may be updated as per a new timing (which may be the same as a programmable fetch start value). A master DPU or a slave DPU may wait for a flush clear by hardware on a respective Vsync interrupt request (irq).

Figure 20:
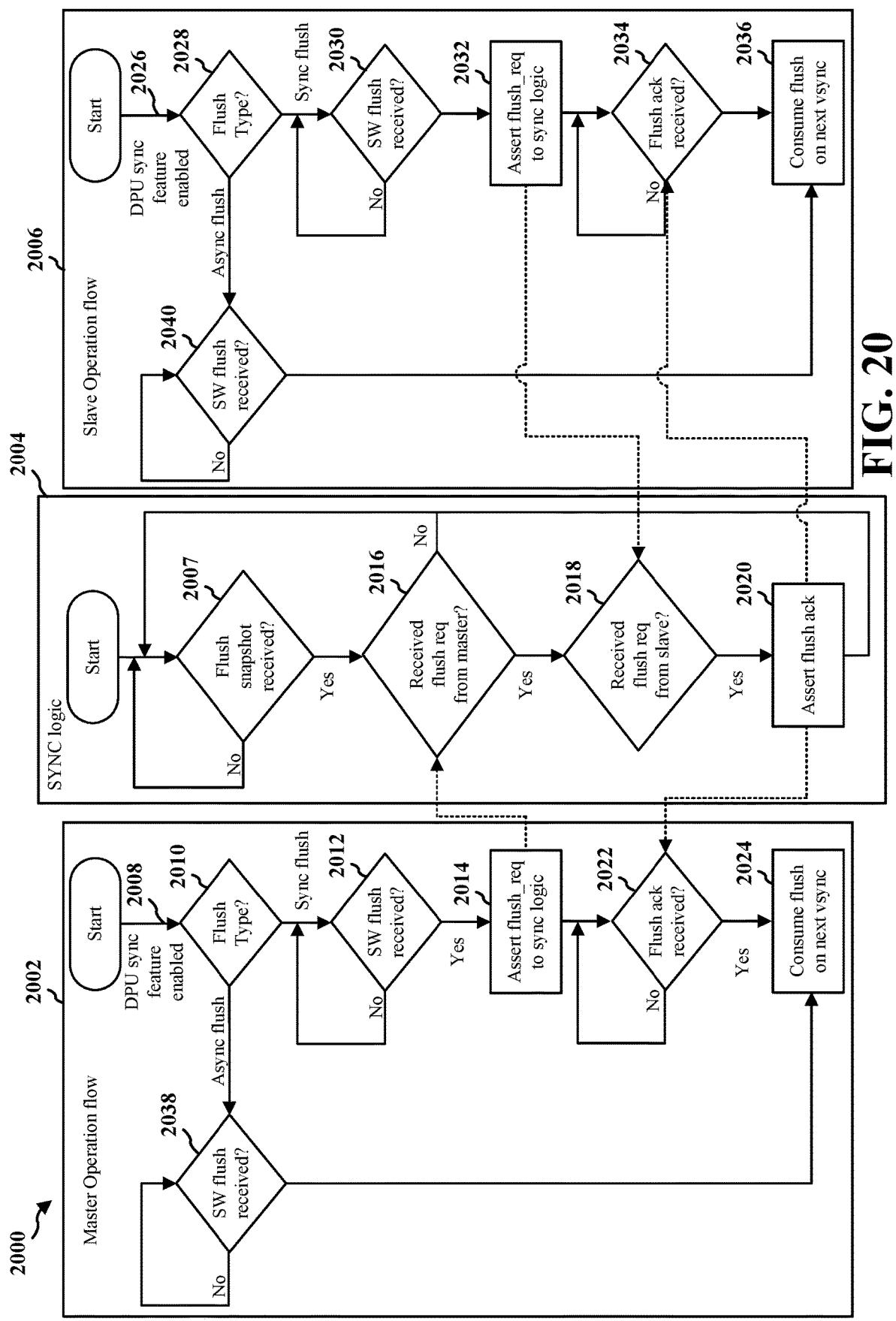
FIG. 20 is a diagram illustrating an example of a behavioral flow associated with flush operations in accordance with one or more techniques of this disclosure.

FIG. 20 is a diagram 2000 illustrating an example of a behavioral flow associated with flush operations in accordance with one or more techniques of this disclosure. The diagram 2000 illustrates a master operation flow 2002, a sync logic operation flow 2004, and a slave operation flow 2006. In an example, the master operation flow 2002 may be associated with a first operation controller of a master DPU, the sync logic operation flow 2004 may be associated with flush sync logic, and the slave operation flow 2006 may be associated with a second operation controller of the master DPU or a first operation controller of a slave DPU.

At 2007, the flush sync logic may determine whether a flush snapshot has been received (e.g., from a timing engine generator). If the flush snapshot has not been received, the flush sync logic may wait for the flush snapshot to be received.

At 2008, the first operation controller of the master DPU may an obtain an indication that a DPU synchronization features is enabled, where the indication may indicate whether synchronous flush or asynchronous flush is enabled. At 2010, the first operation controller may determine a flush type (synchronous or asynchronous) based on the indication. At 2012, if the flush type is synchronous, the first operation controller may determine whether an indication of a software flush has been received, that is, the first operation controller may determine whether an indication of a flush has been received from software associated with the master DPU. If the indication of the software flush is not received, the first operation controller may wait to receive the indication. If the indication of software flush is received, at 2014, the first operation controller may transmit a flush request (i.e., "assert flush_req to sync logic") to the flush sync logic.

At 2016, the flush sync logic may determine whether the flush request has been received from the master DPU (i.e., from the first operation controller of the master DPU). If the flush request has not been received from the master DPU, the flush sync logic may return to 2007 and wait for a flush snap shot to be received.

At 2018, if the flush snapshot has been received and if the flush request has been received from the master DPU, the flush sync logic may determine whether a flush request has been received from the slave DPU. At 2020, if the flush request has been received from the slave DPU, the flush sync logic may transmit an acknowledgment of a flush (i.e., "Assert flush_ack") to the first operation controller of the master DPU. The flush sync logic may then return to 2007.

At 2022, the first operation controller of the master DPU may determine whether the acknowledgment of the flush (i.e., "Assert flush_ack") has been received. If the acknowledgment of the flush has not been received, the first operation controller may wait for the acknowledgment of the flush. At 2024, if the acknowledgment of the flush has been received, the first operation controller may consume a flush at a next Vsync instance. Consuming the flush may include a handshake between DPU hardware and DPU software to swap a double buffered register configuration and auto-clear a flush flag.

At 2026, the second operation controller of the master DPU or the operation controller of the slave DPU may an obtain an indication that a DPU synchronization feature is enabled, where the indication may indicate whether synchronous flush or asynchronous flush is enabled. At 2028, the second operation controller of the master DPU or the operation controller of the slave DPU may determine a flush type (synchronous or asynchronous) based on the indication. At 2030, if the flush type is synchronous, the first operation controller may determine whether an indication of a software flush has been received, that is, the second operation controller of the master DPU or the operation controller of the slave DPU may determine whether an indication of a flush has been received from software (e.g., software associated with the master DPU or software associated with the slave DPU). If the indication of the software flush is not received, the second operation controller of the master DPU or the operation controller of the slave DPU may wait to receive the indication. If the indication of software flush is received, at 2032, the second operation controller of the master DPU or the operation controller of the slave DPU may transmit a flush request (i.e., "assert flush_req to sync logic") to the flush sync logic.

At 2018, the flush sync logic may determine whether the flush request has been received. At 2020, if the flush request has been received, the flush sync logic may transmit an acknowledgment of the flush (i.e., "assert flush_ack") to the second operation controller of the master DPU or the operation controller of the slave DPU. The flush sync logic may then return to 2007.

At 2034, after transmitting the flush request to the sync logic, the second operation controller of the master DPU or the operation controller of the slave DPU may determine whether the acknowledgment of the flush has been received. If the acknowledgment of the flush has not been received, the second operation controller of the master DPU or the operation controller of the slave DPU may wait to receive the flush acknowledgment. At 2036, if the second operation controller of the master DPU or the operation controller of the slave DPU determines that the flush acknowledgment has been received, the second operation controller of the master DPU or the operation controller of the slave DPU consumes a flush on a next vsync instance.

Returning to 2010, if the flush type is asynchronous, at 2038, the first operation controller may determine whether an indication of a software flush has been received, that is, the first operation controller may determine whether an indication of a flush has been received from software associated with the master DPU. If the indication of the software flush is not received, the first operation controller may wait to receive the indication. If the indication of the software flush is received, at 2024, the first operation controller may consume a flush at a next Vsync instance.

Returning to 2028, if the flush type is asynchronous, at 2040, the second operation controller of the master DPU or the operation controller of the slave DPU may determine whether an indication of a flush has been received from software associated with the master DPU or the slave DPU. If the indication of the software flush is not received, the second operation controller of the master DPU or the operation controller of the slave DPU may wait to receive the indication. If the indication of the software flush is received, at 2036, the first operation controller may consume a flush at a next Vsync instance.

Figure 21:
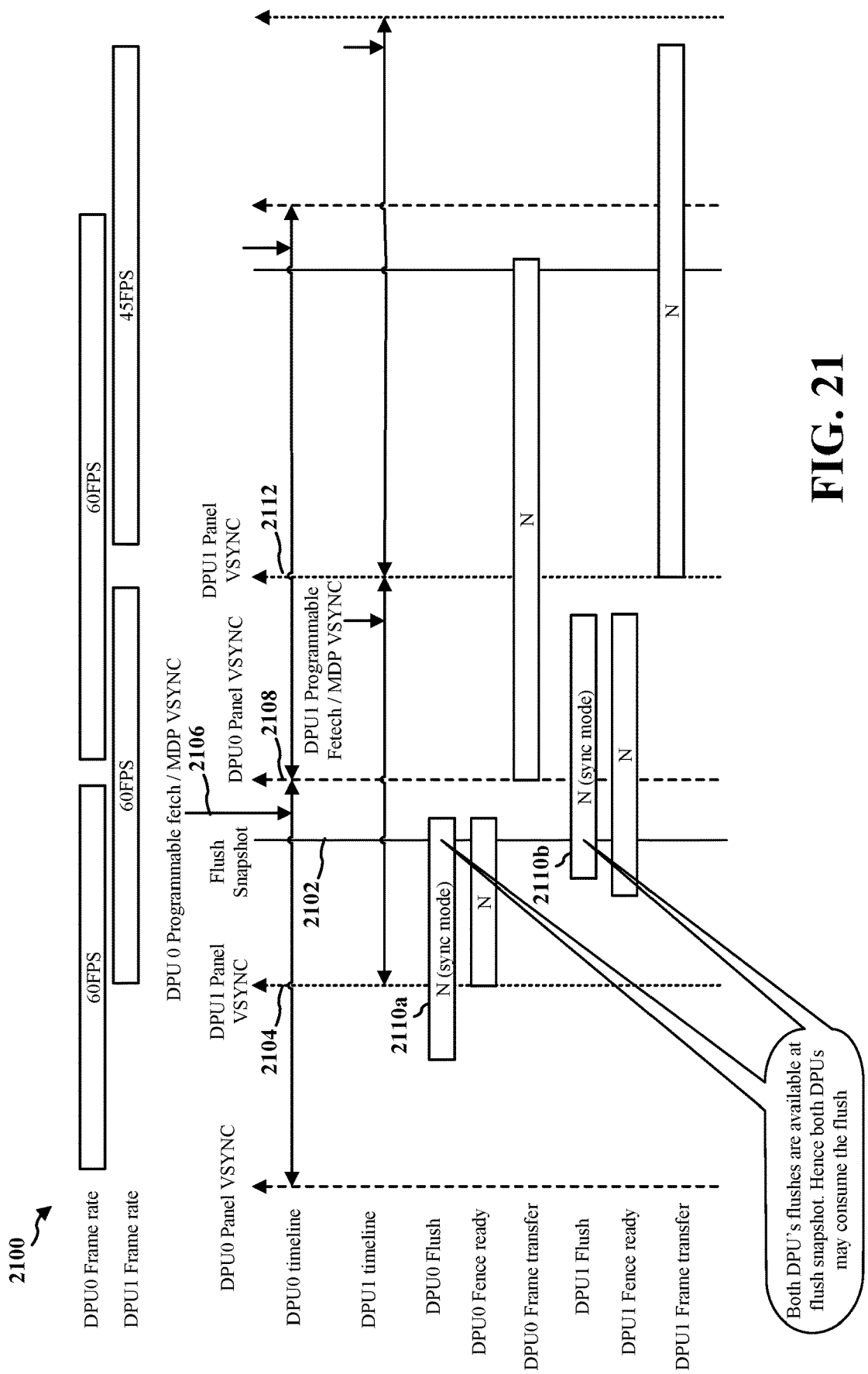
FIG. 21 is a diagram illustrating an example of a flush synchronization timeline in accordance with one or more techniques of this disclosure.

FIG. 21 is a diagram 2100 illustrating an example of a flush synchronization timeline in accordance with one or more techniques of this disclosure. In an example, DPU0 and DPU1 may be operating in a sync mode as described above. A timing engine generator may generate a flush snapshot 2102, where the flush snapshot is an indication of a time instance. The flush snapshot 2102 may occur at any time between a DPU1 panel Vsync instance 2104 (referred to in FIG. 21 as "DPU1 Panel VSYNC") and a prefetch 2106 for DPU0 (referred to in FIG. 21 as "DPU 0 Programmable fetch/MDP VSYNC"). In an example, at the flush snapshot 2102, a first flush may be available for DPU0 and a second flush may be available for DPU1. Based on (1) DPU0 and DPU1 operating in sync mode and (2) the first flush being available and the second flush being available, at a (next available) DPU0 panel VSync instance 2108, DPU0 may consume a first flush with respect to a frame 2110a. Furthermore, at a next available DPU1 panel VSync instance 2112, DPU1 may consume a second flush with respect to a frame 2110b.

Figure 22:
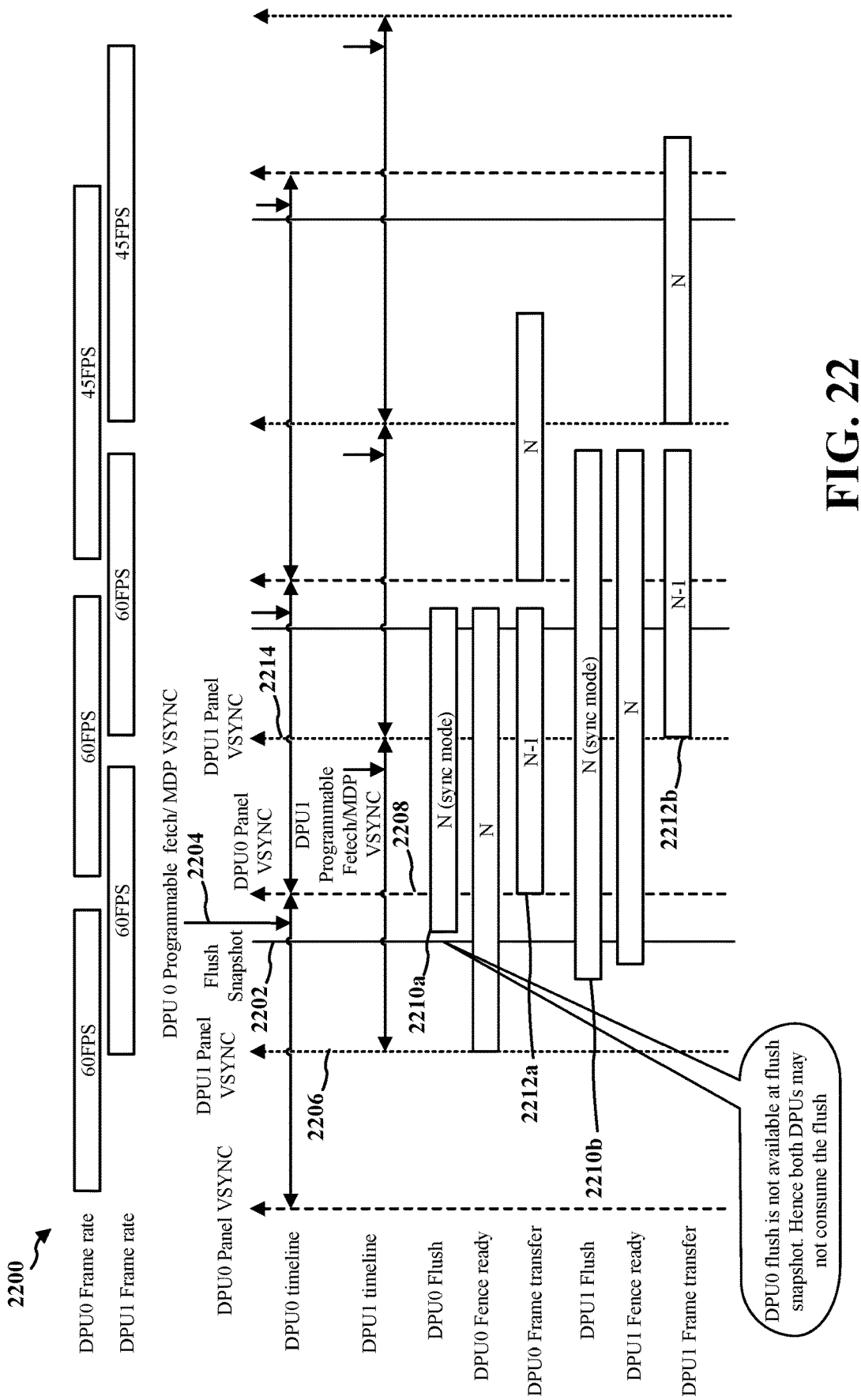
FIG. 22 is a diagram illustrating an example of a flush synchronization timeline in which a master DPU flush is not available at a snapshot point in accordance with one or more techniques of this disclosure.

FIG. 22 is a diagram 2200 illustrating an example of a flush synchronization timeline in which a master DPU flush is not available at a snapshot point in accordance with one or more techniques of this disclosure. In an example, DPU0 and DPU1 may be operating in a sync mode as described above. A timing engine generator may generate a flush snapshot 2202, where the flush snapshot is an indication of a time instance. The flush snapshot 2202 may occur at any time between a DPU1 panel Vsync instance 2204 (referred to in FIG. 22 as "DPU1 Panel VSYNC") and a prefetch 2206 for DPU0 (referred to in FIG. 22 as "DPU 0 Programmable fetch/MDP VSYNC"). In an example, at the flush snapshot 2202, a first flush may not be available for DPU0 and a second flush may be available for DPU1. Based on (1) DPU0 and DPU1 operating in sync mode and (2) the first flush being not available and the second flush being available, at a next available DPU0 panel VSync instance 2208, DPU0 may not consume a first flush with respect to an Nth frame 2210a, and as a result, DPU0 may repeat a N-1 frame 2212a (i.e., a previous frame). Furthermore, at a next available DPU1 panel VSync instance 2214, DPU1 may not consume a second flush with respect to a Nth frame 2210b even though the second flush is available. As a result, DPU1 may repeat a N-1 frame 2212b (i.e., a previous frame).

Figure 23:
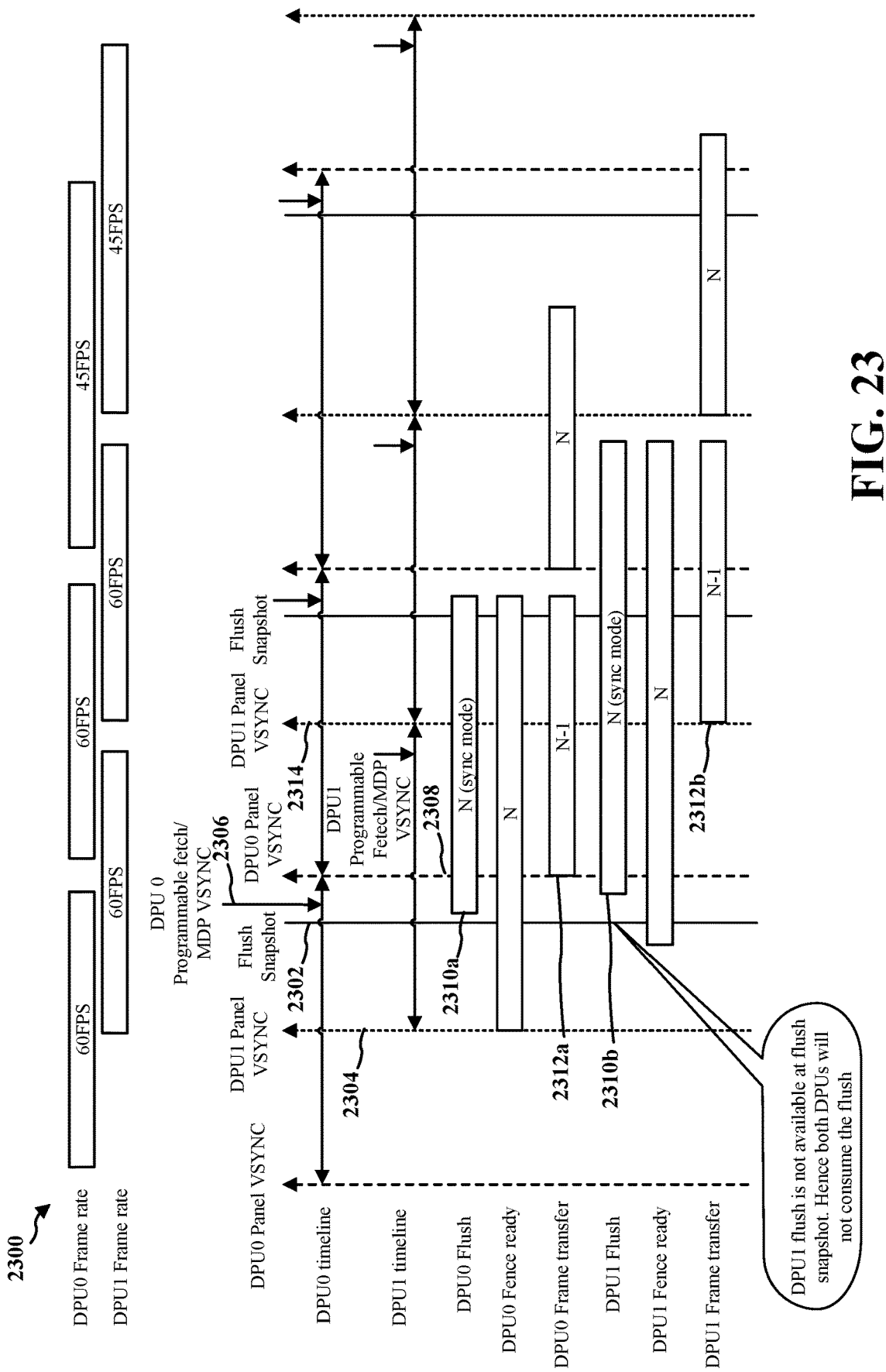
FIG. 23 is a diagram illustrating an example of a flush synchronization timeline in which a slave DPU flush is not available at a snapshot point in accordance with one or more techniques of this disclosure.

FIG. 23 is a diagram 2300 illustrating an example of a flush synchronization timeline in which a slave DPU flush is not available at a snapshot point in accordance with one or more techniques of this disclosure. In an example, DPU0 and DPU1 may be operating in a sync mode as described above. A timing engine generator may generate a flush snapshot 2302, where the flush snapshot 2302 is an indication of a time instance. The flush snapshot 2302 may occur at any time between a DPU1 panel Vsync instance 2304 (referred to in FIG. 23 as "DPU1 Panel VSYNC") and a prefetch 2306 for DPU0 (referred to in FIG. 23 as "DPU 0 Programmable fetch/MDP VSYNC"). In an example, at the flush snapshot 2302, a first flush may be available for DPU0 and a second flush may not be available for DPU1. Based on (1) DPU0 and DPU1 operating in sync mode and (2) the first flush being available and the second flush not being available, at a next available DPU0 panel VSync instance 2308, DPU0 may not consume a first flush with respect to an Nth frame 2310a even though the first flush is available. As a result, DPU0 may repeat a N-1 frame 2312a (i.e., a previous frame). Furthermore, at a next available DPU1 panel VSync instance 2314, DPU1 may not consume a second flush with respect to a Nth frame 2310b, and as a result, DPU1 may repeat a N-1 frame 2312b (i.e., a previous frame).

Figure 24:
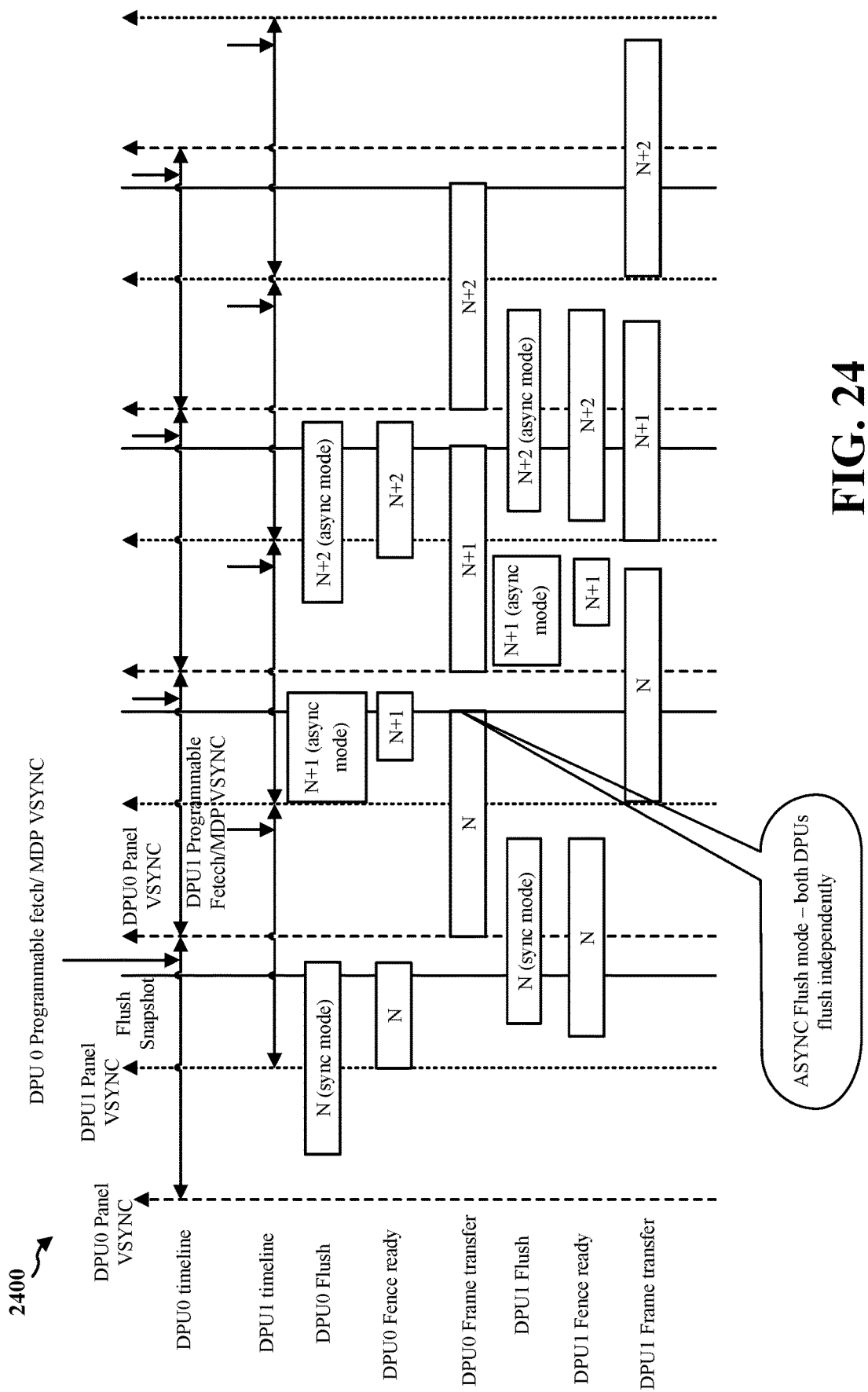
FIG. 24 is a diagram illustrating an example of a flush synchronization timeline in accordance with one or more techniques of this disclosure.
Figure 25:
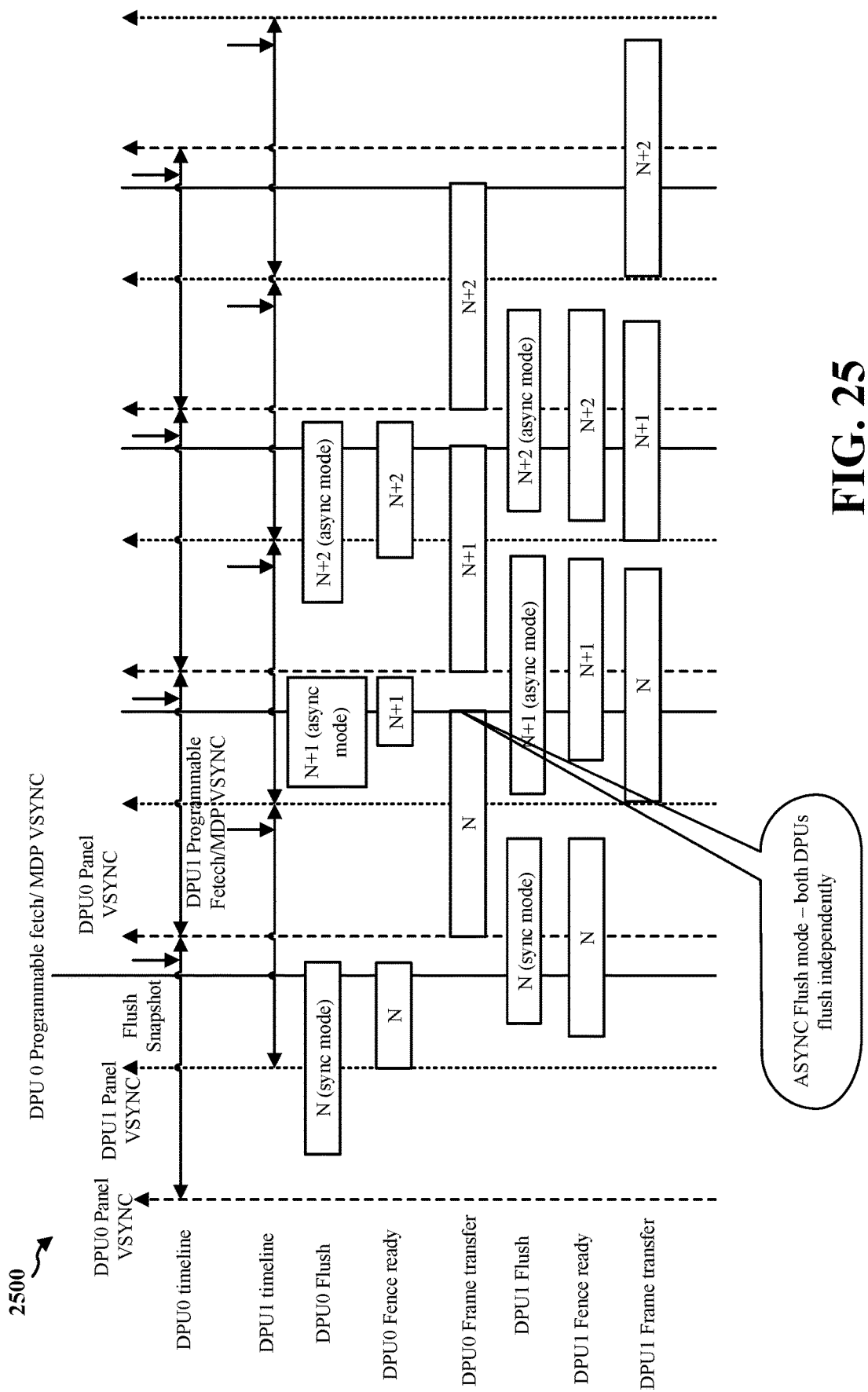
FIG. 25 is a diagram illustrating an example of a flush synchronization timeline in accordance with one or more techniques of this disclosure.

FIG. 24 is a diagram 2400 illustrating an example of a flush synchronization timeline in accordance with one or more techniques of this disclosure. FIG. 25 is a diagram 2500 illustrating an example of a flush synchronization timeline in accordance with one or more techniques of this disclosure. Referring jointly now to FIGS. 24 and 25, DPU0 and DPU1 may be operating in async mode as described above. When operating in async mode, DPU0 and DPU1 may consume flush(es) independently of one another. For example, DPU0 may consume a first flush at a VSync instance for DPU0 even if a second flush is not available for DPU1 at a corresponding VSync instance for DPU1.

Figure 26:
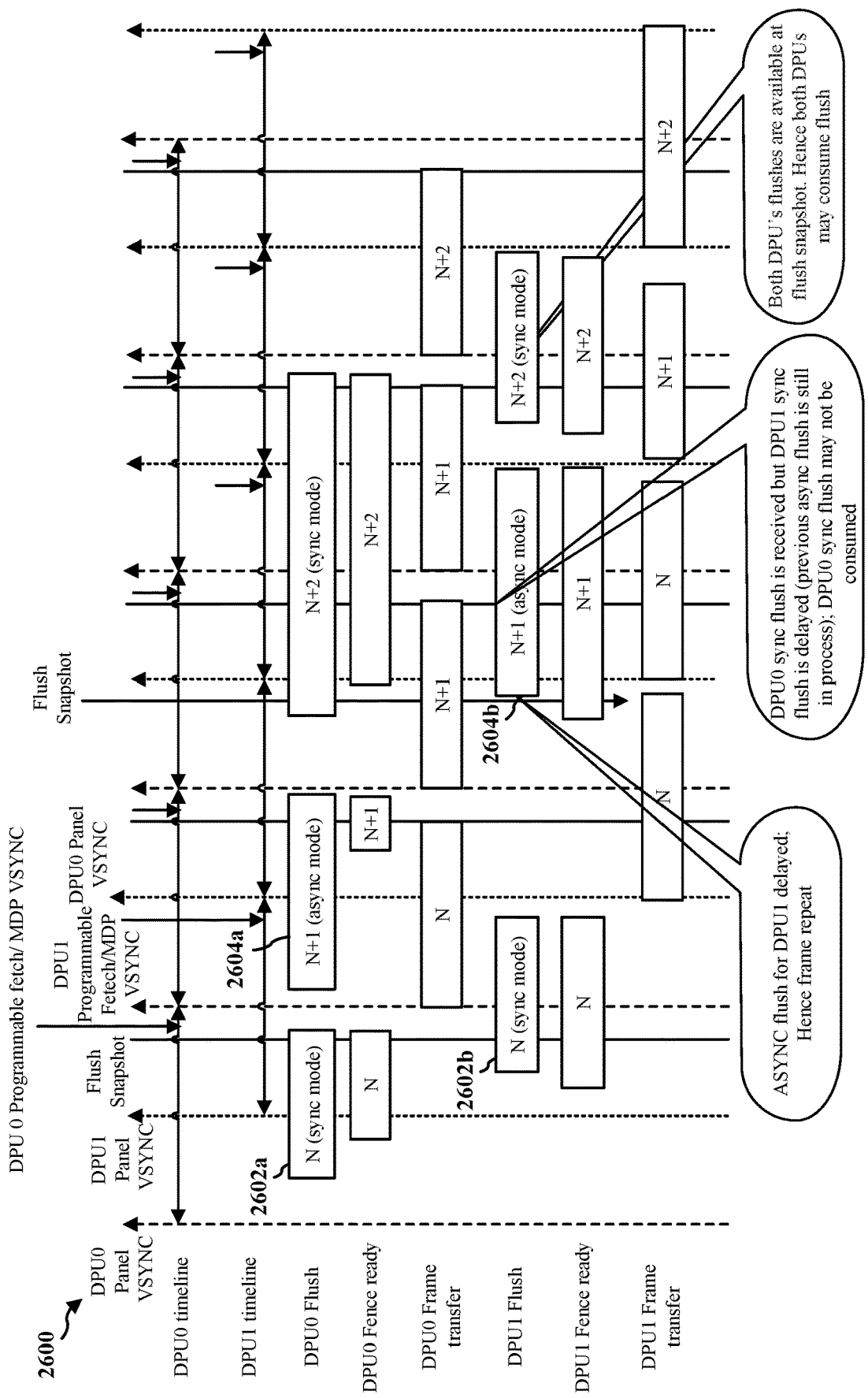
FIG. 26 is a diagram illustrating an example of dynamic switching between a sync mode and an async mode in accordance with one or more techniques of this disclosure.

FIG. 26 is a diagram 2600 illustrating an example of dynamic switching between a sync mode and an async mode in accordance with one or more techniques of this disclosure. In one aspect, DPU0 and DPU1 may dynamically switch between sync mode and async mode. For instance, DPU0 and DPU1 may dynamically switch between sync mode and async mode based on an indication received from software (e.g., the first DPU software 906, the second DPU software 912, etc.).

In an example, DPU0 and DPU1 may be operating in sync mode. DPU0 may consume a first flush with respect to an Nth frame 2602a and DPU1 may consume a second flush with respect to an Nth frame 2602b. Subsequently, DPU0 and DPU1 may switch to operate in async mode. An (async) flush for DPU1 may be delayed, and as result DPU1 may repeat the Nth frame 2602b while DPU0 consumes a flush with respect to a N+1 frame 2604a. Subsequently, DPU0 and DPU1 may switch to operating in sync mode. DPU0 may receive a sync flush (i.e., a flush may be available for DPU0); however, a DPU1 sync flush may be delayed due to the previous async flush still being in progress. As a result, a DPU0 sync flush may not be consumed and DPU0 may repeat a N+1 frame 2604a. Subsequently, when in sync mode and when a flush is available for both DPU0 and DPU1, DPU0 may consume a flush with respect to the N+1 frame 2604a and DPU1 may consume a flush with respect to N+1 frame 2604b.

Figure 27:
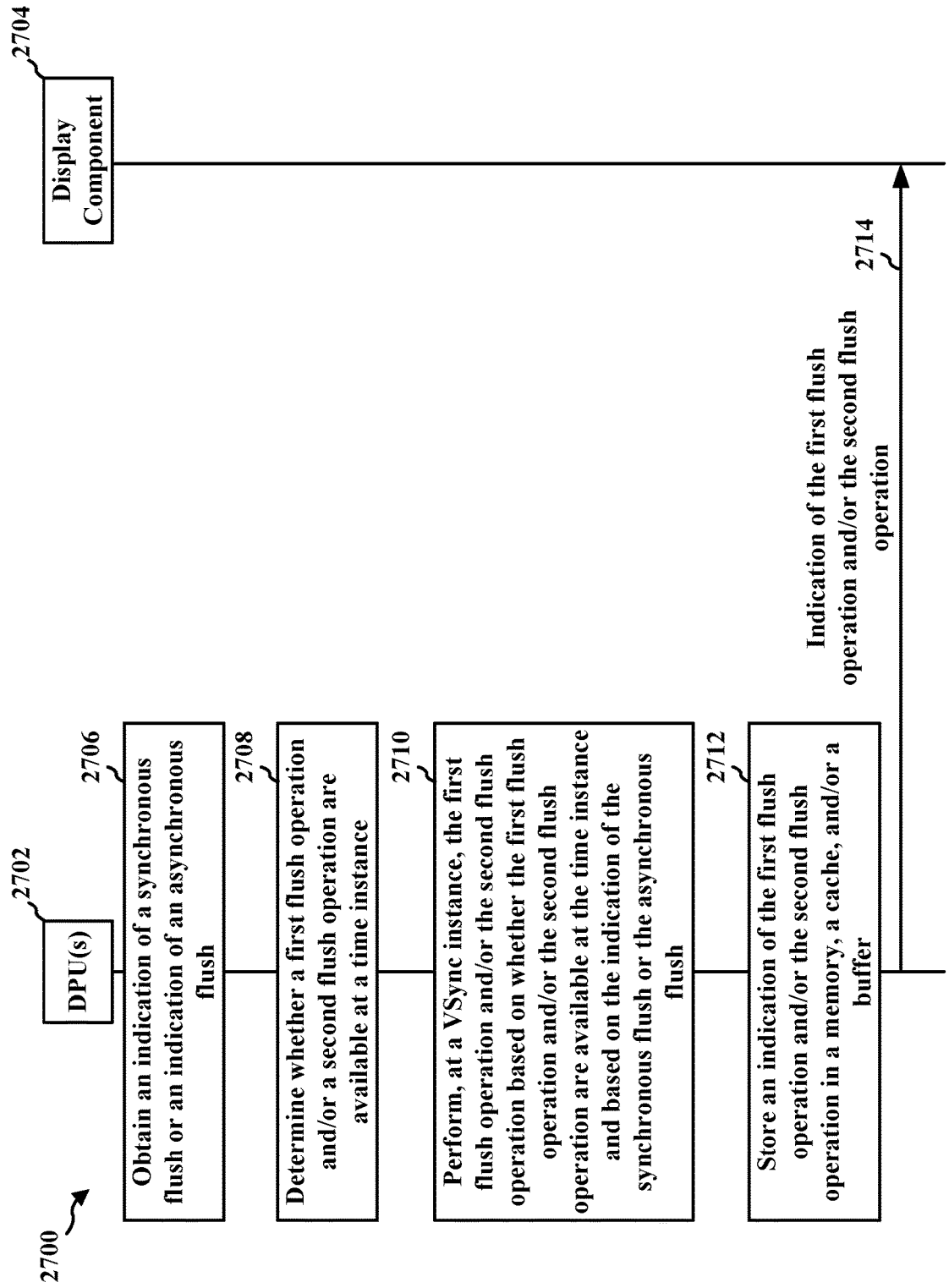
FIG. 27 is a call flow diagram illustrating example communications between DPU(s) and a display component in accordance with one or more techniques of this disclosure.

FIG. 27 is a call flow diagram 2700 illustrating example communications between DPU(s) 2702 and a display component 2704 in accordance with one or more techniques of this disclosure. The DPU(s) may include a master DPU (i.e., a first DPU). The DPU(s) may also include a slave DPU (i.e., a second DPU). The display component 2704 may be a component of a DPU or a component of a display panel.

At 2706, the DPU(s) 2702 may obtain an indication of a synchronous flush or an indication of an asynchronous flush with respect to a first DPU and/or a second DPU. At 2708, the DPU(s) 2702 may determine whether a first flush operation and/or a second flush operation are available at a time instance. The first flush operation and the second flush operation may be associated with the first DPU and/or the second DPU. The first flush operation and the second flush operation may be associated with a swap of a double buffered register configuration. At 2710, the DPU(s) 2702 may perform, at a VSync instance, the first flush operation and/or the second flush operation based on whether the first flush operation and/or the second flush operation are available at the time instance and based on the indication of the synchronous flush or the indication of the asynchronous flush. At 2712, the DPU(s) may store an indication of the first flush operation and/or the second flush operation in a memory, a cache, and/or a buffer. At 2714, the DPU(s) 2702 may transmit an indication of the first flush operation and/or the second flush operation to the display component 2704.

Figure 28:
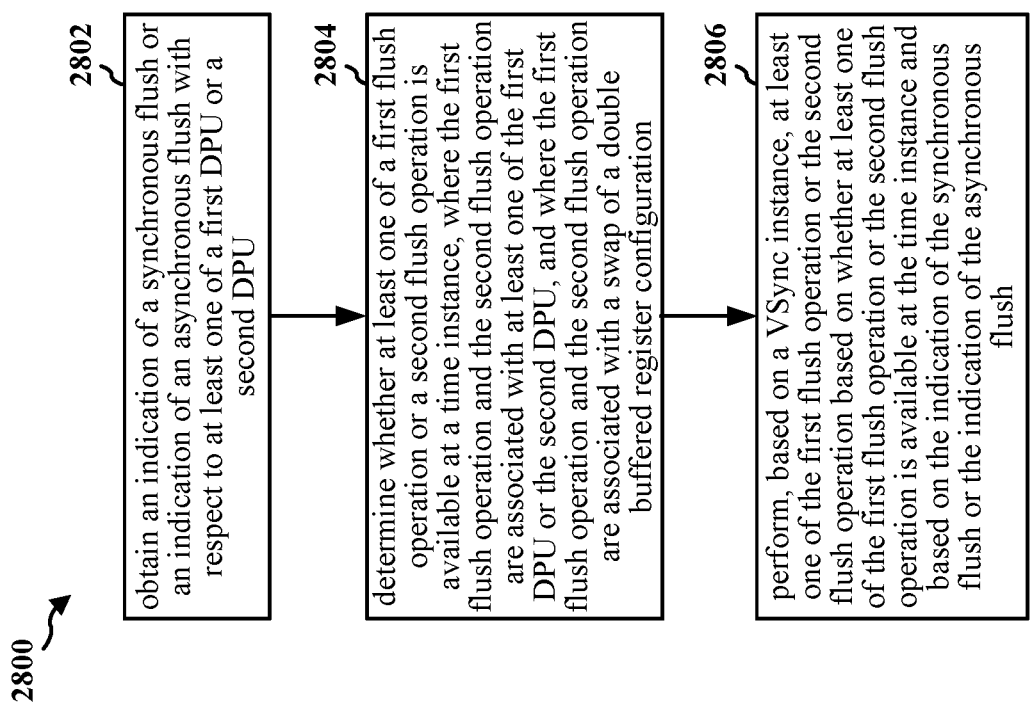
FIG. 28 is a flowchart of an example method of display processing in accordance with one or more techniques of this disclosure.

FIG. 28 is a flowchart 2800 of an example method of display processing in accordance with one or more techniques of this disclosure. The method may be performed by an apparatus, such as an apparatus for display processing, a DPU or other display processor, a wireless communication device, and the like, as used in connection with the aspects of FIGS. 1-27. In an example, the method may be performed by the refresh rate updater 198.

At 2802, the apparatus (e.g., a DPU) obtains an indication of a synchronous flush or an indication of an asynchronous flush with respect to at least one of a first DPU or a second DPU. For example, FIG. 27 at 2706 shows that the DPU(s) 2702 may obtain an indication of a synchronous flush or an indication of an asynchronous flush with respect to at least one of a first DPU or a second DPU. In an example, the first DPU may be or include the first DPU 410A, the first DPU 902, or the master DPU 1102. In an example, the second DPU may be or include the second DPU 410B, the second DPU 908, or the slave DPU 1002. In an example, the first DPU and the second DPU may be within a VR headset. In an example, the aforementioned aspect may correspond to 2008 and/or 2026 in FIG. 20. In an example, 2802 may be performed by the refresh rate updater 198.

At 2804, the apparatus (e.g., a DPU) determines whether at least one of a first flush operation or a second flush operation is available at a time instance, where the first flush operation and the second flush operation are associated with at least one of the first DPU or the second DPU, and where the first flush operation and the second flush operation are associated with a swap of a double buffered register configuration. For example, FIG. 28 at 2708 shows that the DPU(s) 2702 may determine whether at least one of a first flush operation or a second flush operation is available at a time instance, where the first flush operation and the second flush operation are associated with at least one of the first DPU or the second DPU, and where the first flush operation and the second flush operation are associated with a swap of a double buffered register configuration. In an example, a flush may be available when the programmable register(s) associated with the flush have been fully configured such that a swap of the register configuration is able to be performed. In an example, the aforementioned aspect may correspond to 2038, 2022, 2040, and/or 2034 in FIG. 20. In an example, the time instance may be a flush snapshot (e.g., the flush snapshot 2102, the flush snapshot 2202, etc.). In an example, 2804 may be performed by the refresh rate updater 198.

At 2806, the apparatus (e.g., a DPU) performs, based on a VSync instance, at least one of the first flush operation or the second flush operation based on whether at least one of the first flush operation or the second flush operation is available at the time instance and based on the indication of the synchronous flush or the indication of the asynchronous flush. For example, FIG. 27 at 2710 shows that the DPU(s) 2702 may perform, based on a VSync instance (e.g., immediately prior to the VSync instance, at the VSync instance, immediately after the VSync instance), at least one of the first flush operation or the second flush operation based on whether at least one of the first flush operation or the second flush operation is available at the time instance and based on the indication of the synchronous flush or the indication of the asynchronous flush. In an example, the aforementioned aspect may correspond to 2024 and/or 2036 in FIG. 20. In an example, the VSync instance may be the DPU1 panel Vsync instance 2104, the DPU0 panel VSync instance 2108, etc. In an example, 2806 may be performed by the refresh rate updater 198.

FIG. 29 is a flowchart 2900 of an example method of display processing in accordance with one or more techniques of this disclosure. The method may be performed by an apparatus, such as an apparatus for display processing, a DPU or other display processor, a wireless communication device, and the like, as used in connection with the aspects of FIGS. 1-27. In an example, the method (including the various aspects detailed below) may be performed by the refresh rate updater 198.

At 2902, the apparatus (e.g., a DPU) obtains an indication of a synchronous flush or an indication of an asynchronous flush with respect to at least one of a first DPU or a second DPU. For example, FIG. 28 at 2706 shows that the DPU(s) 2702 may obtain an indication of a synchronous flush or an indication of an asynchronous flush with respect to at least one of a first DPU or a second DPU. In an example, the first DPU may be or include the first DPU 410A, the first DPU 902, or the master DPU 1102. In an example, the second DPU may be or include the second DPU 410B, the second DPU 908, or the slave DPU 1002. In an example, the first DPU and the second DPU may be within a VR headset. In an example, the aforementioned aspect may correspond to 2008 and/or 2026 in FIG. 20. In an example, 2902 may be performed by the refresh rate updater 198.

At 2904, the apparatus (e.g., a DPU) determines whether at least one of a first flush operation or a second flush operation is available at a time instance, where the first flush operation and the second flush operation are associated with at least one of the first DPU or the second DPU, and where the first flush operation and the second flush operation are associated with a swap of a double buffered register configuration. For example, FIG. 28 at 2708 shows that the DPU(s) 2702 may determine whether at least one of a first flush operation or a second flush operation is available at a time instance, where the first flush operation and the second flush operation are associated with at least one of the first DPU or the second DPU, and where the first flush operation and the second flush operation are associated with a swap of a double buffered register configuration. In an example, a flush may be available when the programmable register(s) have associated with the flush have been fully configured such that a swap of the register configuration is able to be performed. In an example, the time instance may be a flush snapshot (e.g., the flush snapshot 2102, the flush snapshot 2202, etc.). In an example, the aforementioned aspect may correspond to 2038, 2022, 2040, and/or 2034 in FIG. 20. In an example, the VSync instance may be the DPU1 panel Vsync instance 2104, the DPU0 panel VSync instance 2108, etc. In an example, 2904 may be performed by the refresh rate updater 198.

At 2906, the apparatus (e.g., a DPU) performs, based on a VSync instance, at least one of the first flush operation or the second flush operation based on whether at least one of the first flush operation or the second flush operation is available at the time instance and based on the indication of the synchronous flush or the indication of the asynchronous flush. For example, FIG. 27 at 2710 shows that the DPU(s) 2702 may perform, based on a VSync instance (e.g., immediately prior to the VSync instance, at the VSync instance, immediately after the VSync instance), at least one of the first flush operation or the second flush operation based on whether at least one of the first flush operation or the second flush operation is available at the time instance and based on the indication of the synchronous flush or the indication of the asynchronous flush. In an example, the aforementioned aspect may correspond to 2024 and/or 2036 in FIG. 20. In an example, 2906 may be performed by the refresh rate updater 198.

In one aspect, performing at least one of the first flush operation or the second flush operation may include performing a handshake between software associated with at least one of the first DPU or the second DPU and hardware associated with at least one of the first DPU or the second DPU. In an example, the software associated with at least one of the first DPU or the second DPU may be or include the first DPU software 906 and/or the second DPU software 912. In an example, the hardware associated with at least one of the first DPU or the second DPU may be or include the first DPU 902 (or the first hardware scheduler 904) and/or the second DPU 908 (or the second hardware scheduler 910). In an example, performing at least one of the first flush operation or the second flush operation at 2710 may include performing a handshake between software associated with at least one of the first DPU or the second DPU and hardware associated with at least one of the first DPU or the second DPU.

In one aspect, performing the handshake may cause the hardware associated with at least one of the first DPU or the second DPU to swap the double buffered register configuration and clear a flush flag associated with at least one of the first flush operation or the second flush operation. In an example, performing the handshake between software associated with at least one of the first DPU or the second DPU and hardware associated with at least one of the first DPU or the second DPU at 2710 may include causing the hardware associated with at least one of the first DPU or the second DPU to swap the double buffered register configuration and clear a flush flag associated with at least one of the first flush operation or the second flush operation. In one aspect, the indication of the synchronous flush may be obtained, where the VSync instance may be a next available VSync instance that occurs after the time instance, and where performing at least one of the first flush operation or the second flush operation may include: performing, at the next available VSync instance, the first flush operation and the second flush operation based on the first flush operation and the second flush operation being available at the time instance. In an example, the aforementioned aspect may correspond to 2008, 2010, 2012, 2022, and 2024 of FIG. 20. In another example, the aforementioned aspect may correspond to 2026, 2028, 2030, and 2036 of FIG. 20. In a further example, the aforementioned aspect may be associated with aspects described above in connection with FIG. 21.

In one aspect, at 2908, the apparatus (e.g., a DPU) may obtain, based on the performance of the first flush operation and the second flush operation, the indication of the asynchronous flush. In an example, the aforementioned aspect may be associated with aspects described above in connection with FIGS. 24-26. In an example, 2908 may be performed by the refresh rate updater 198.

In one aspect, at 2910, the apparatus (e.g., a DPU) may determine whether at least one of a third flush operation or a fourth flush operation is available at a second time instance that occurs after the time instance, where the third flush operation and the fourth flush operation may be associated with at least one of the first DPU or the second DPU, and where the third flush operation and the fourth flush operation may be associated with a second swap of a second double buffered register configuration. In an example, the aforementioned aspect may be associated with aspects described above in connection with FIGS. 24-26. In an example, 2910 may be performed by the refresh rate updater 198.

In one aspect, at 2912, the apparatus (e.g., a DPU) may perform, at a second next available VSync instance, the third flush operation or the fourth flush operation based on the third flush operation or the fourth flush operation being available at the second time instance, where the second next available VSync instance may be subsequent to the next available VSync instance. In an example, the aforementioned aspect may be associated with aspects described above in connection with FIGS. 24-26. In an example, 2912 may be performed by the refresh rate updater 198.

In one aspect, the indication of the synchronous flush may be obtained, where the VSync instance may be a next available VSync instance at which both the first flush operation and the second flush operation are available, and performing at least one of the first flush operation or the second flush operation may include: performing, at the next available VSync instance at which both the first flush operation and the second flush operation are available, the first flush operation and the second flush operation based on the first flush operation and the second flush operation being available at the time instance. In an example, the aforementioned aspect may be associated with aspects described above in connection with FIG. 22 or FIG. 23.

In one aspect, the indication of the asynchronous flush may be obtained, where the VSync instance may be a next available VSync instance, and where performing at least one of the first flush operation or the second flush operation may include: performing, at the next available VSync instance, the first flush operation or the second flush operation based on one of the first flush operation or the second flush operation being available at the next available VSync instance. In an example, the aforementioned aspect may be associated with aspects described above in connection with 2008, 2010, 2038, and 2024 of FIG. 20. In an example, the aforementioned aspect may be associated with aspects described above in connection with 2026, 2028, 2040, and 2036 of FIG. 20. In an example, the aforementioned aspect may be associated with aspects described above in connection with FIGS. 24-26.

In one aspect, at 2914, the apparatus (e.g., a DPU) may obtain, based on the performance of the first flush operation or the second flush operation, the indication of the synchronous flush. In an example, the aforementioned aspect may be associated with aspects described above in connection with FIG. 26. In an example, 2914 may be performed by the refresh rate updater 198.

In one aspect, at 2916, the apparatus (e.g., a DPU) may determine whether at least one of a third flush operation or a fourth flush operation is available at a second time instance that occurs after the time instance, where the third flush operation and the fourth flush operation may be associated with at least one of the first DPU or the second DPU, and where the third flush operation and the fourth flush operation may be associated with a second swap of a second double buffered register configuration. In an example, the aforementioned aspect may be associated with aspects described above in connection with FIGS. 21-23. In an example, 2916 may be performed by the refresh rate updater 198.

In one aspect, at 2918, the apparatus (e.g., a DPU) may perform, at a second next available VSync instance, the third flush operation and the fourth flush operation based on the third flush operation or the fourth flush operation being available at the second time instance, where the second next available VSync instance may be subsequent to the next available VSync instance. In an example, the aforementioned aspect may be associated with aspects described above in connection with FIGS. 21-23. In an example, 2918 may be performed by the refresh rate updater 198.

In one aspect, the first flush operation may be associated with a first controller of the first DPU and the second flush operation may be associated with a second controller of the second DPU. For example, first controller of the first DPU may be the first operation controller 1110 and the second controller of the second DPU may be the first operation controller 1010.

In one aspect, the first flush operation may be associated with a first controller of the first DPU and the second flush operation may be associated with a second controller of the first DPU. For example, the first controller of the first DPU may be the first operation controller 1110 and the second controller of the first DPU may be the second operation controller 1112.

In one aspect, performing at least one of the first flush operation or the second flush operation may maintain a skew between first frames displayed on a first display panel and second frames displayed on a second display panel, where at least one of the first DPU or the second DPU may be associated with the first display panel and the second display panel. For example, maintaining the skew may include aspects described above in connection with FIG. 9. In an example, the first display panel may be the first display 406A and the first frames may be included in the first processed frame 414A. In an example, the second display panel may be the second display 406B and the second frames may be included in the second processed frame 414B.

In one aspect, at least one of the first flush operation or the second flush operation may be performed based upon a VRR update being performed with respect to at least one of the first display panel or the second display panel. For example, the aforementioned aspect may be associated with aspects described above in connection with FIG. 9.

In one aspect, at 2920, the apparatus (e.g., a DPU) may output an indication of the performance of at least one of the first flush operation or the second flush operation. For example, FIG. 27 at 2712 and/or 2714 shows that the DPU(s) may output an indication of the performance of at least one of the first flush operation or the second flush operation. In an example, 2920 may be performed by the refresh rate updater 198.

In one aspect, outputting the indication of the performance of at least one of the first flush operation or the second flush operation may include: storing the indication of the performance of at least one of the first flush operation or the second flush operation in at least one of a memory, a cache, or a buffer. For example, FIG. 27 at 2712 shows that the DPU(s) 2702 may store the indication of the performance of at least one of the first flush operation or the second flush operation in at least one of a memory, a cache, or a buffer.

In one aspect, outputting the indication of the performance of at least one of the first flush operation or the second flush operation may include: transmitting the indication of the performance of at least one of the first flush operation or the second flush operation. For example, FIG. 27 at 2714 shows that the DPU(s) 2702 may transmit the indication of the performance of at least one of the first flush operation or the second flush operation.

In one aspect, performing at least one of the first flush operation or the second flush operation may include: consuming, at the VSync instance, at least one of the first flush operation or the second flush operation based on whether at least one of the first flush operation or the second flush operation is available at the time instance and based on the indication of the synchronous flush or the indication of the asynchronous flush. For example, performing at least one of the first flush operation or the second flush operation at 2712 may include consuming, at the VSync instance, at least one of the first flush operation or the second flush operation based on whether at least one of the first flush operation or the second flush operation is available at the time instance and based on the indication of the synchronous flush or the indication of the asynchronous flush.

In configurations, a method or an apparatus for display processing is provided. The apparatus may be a DPU, a display processor, or some other processor that may perform display processing. In aspects, the apparatus may be the display processor 127 within the device 104, or may be some other hardware within the device 104 or another device. The apparatus may include means for obtaining an indication of a synchronous flush or an indication of an asynchronous flush with respect to at least one of a first display processing unit (DPU) or a second DPU. The apparatus may further include means for determining whether at least one of a first flush operation or a second flush operation is available at a time instance, where the first flush operation and the second flush operation are associated with at least one of the first DPU or the second DPU, and where the first flush operation and the second flush operation are associated with a swap of a double buffered register configuration. The apparatus may further include means for performing, based on a vertical synchronization (VSync) instance, at least one of the first flush operation or the second flush operation based on whether at least one of the first flush operation or the second flush operation is available at the time instance and based on the indication of the synchronous flush or the indication of the asynchronous flush. The apparatus may further include means for obtaining, based on the performance of the first flush operation and the second flush operation, the indication of the asynchronous flush. The apparatus may further include means for determining whether at least one of a third flush operation or a fourth flush operation is available at a second time instance that occurs after the time instance, where the third flush operation and the fourth flush operation are associated with at least one of the first DPU or the second DPU, and where the third flush operation and the fourth flush operation are associated with a second swap of a second double buffered register configuration. The apparatus may further include means for performing, at a second next available VSync instance, the third flush operation or the fourth flush operation based on the third flush operation or the fourth flush operation being available at the second time instance, where the second next available VSync instance is subsequent to the next available VSync instance. The apparatus may further include means for obtaining, based on the performance of the first flush operation or the second flush operation, the indication of the synchronous flush. The apparatus may further include means for determining whether at least one of a third flush operation or a fourth flush operation is available at a second time instance that occurs after the time instance, where the third flush operation and the fourth flush operation are associated with at least one of the first DPU or the second DPU, and where the third flush operation and the fourth flush operation are associated with a second swap of a second double buffered register configuration. The apparatus may further include means for performing, at a second next available VSync instance, the third flush operation and the fourth flush operation based on the third flush operation or the fourth flush operation being available at the second time instance, where the second next available VSync instance is subsequent to the next available VSync instance. The apparatus may further include means for outputting an indication of the performance of at least one of the first flush operation or the second flush operation.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of display processing, including: obtaining an indication of a synchronous flush or an indication of an asynchronous flush with respect to at least one of a first display processing unit (DPU) or a second DPU; determining whether at least one of a first flush operation or a second flush operation is available at a time instance, where the first flush operation and the second flush operation are associated with at least one of the first DPU or the second DPU, and where the first flush operation and the second flush operation are associated with a swap of a double buffered register configuration; and performing, based on a vertical synchronization (VSync) instance, at least one of the first flush operation or the second flush operation based on whether at least one of the first flush operation or the second flush operation is available at the time instance and based on the indication of the synchronous flush or the indication of the asynchronous flush.

Aspect 2 may be combined with aspect 1 and includes that performing at least one of the first flush operation or the second flush operation includes performing a handshake between software associated with at least one of the first DPU or the second DPU and hardware associated with at least one of the first DPU or the second DPU.

Aspect 3 may be combined with aspect 2 and includes that performing the handshake causes the hardware associated with at least one of the first DPU or the second DPU to swap the double buffered register configuration and clear a flush flag associated with at least one of the first flush operation or the second flush operation.

Aspect 4 may be combined with any of aspects 1-3 and includes that the indication of the synchronous flush is obtained, where the VSync instance is a next available VSync instance that occurs after the time instance, and where performing at least one of the first flush operation or the second flush operation includes: performing, at the next available VSync instance, the first flush operation and the second flush operation based on the first flush operation and the second flush operation being available at the time instance.

Aspect 5 may be combined with aspect 4 and further includes obtaining, based on the performance of the first flush operation and the second flush operation, the indication of the asynchronous flush; determining whether at least one of a third flush operation or a fourth flush operation is available at a second time instance that occurs after the time instance, where the third flush operation and the fourth flush operation are associated with at least one of the first DPU or the second DPU, and where the third flush operation and the fourth flush operation are associated with a second swap of a second double buffered register configuration; and performing, at a second next available VSync instance, the third flush operation or the fourth flush operation based on the third flush operation or the fourth flush operation being available at the second time instance, where the second next available VSync instance is subsequent to the next available VSync instance.

Aspect 6 may be combined with any of aspects 1-3 and includes that the indication of the synchronous flush is obtained, where the VSync instance is a next available VSync instance at which both the first flush operation and the second flush operation are available, and where performing at least one of the first flush operation or the second flush operation includes: performing, at the next available VSync instance at which both the first flush operation and the second flush operation are available, the first flush operation and the second flush operation based on the first flush operation and the second flush operation being available at the time instance.

Aspect 7 may be combined with any of aspects 1-3 and includes that the indication of the asynchronous flush is obtained, where the VSync instance is a next available VSync instance, and where performing at least one of the first flush operation or the second flush operation includes: performing, at the next available VSync instance, the first flush operation or the second flush operation based on one of the first flush operation or the second flush operation being available at the next available VSync instance.

Aspect 8 may be combined with aspect 7 and further includes obtaining, based on the performance of the first flush operation or the second flush operation, the indication of the synchronous flush; determining whether at least one of a third flush operation or a fourth flush operation is available at a second time instance that occurs after the time instance, where the third flush operation and the fourth flush operation are associated with at least one of the first DPU or the second DPU, and where the third flush operation and the fourth flush operation are associated with a second swap of a second double buffered register configuration; and performing, at a second next available VSync instance, the third flush operation and the fourth flush operation based on the third flush operation or the fourth flush operation being available at the second time instance, where the second next available VSync instance is subsequent to the next available VSync instance.

Aspect 9 may be combined with any of aspects 1-8 and includes that the first flush operation is associated with a first controller of the first DPU and the second flush operation is associated with a second controller of the second DPU.

Aspect 10 may be combined with any of aspects 1-8 and includes that the first flush operation is associated with a first controller of the first DPU and the second flush operation is associated with a second controller of the first DPU.

Aspect 11 may be combined with any of aspects 1-10 and includes that performing at least one of the first flush operation or the second flush operation maintains a skew between first frames displayed on a first display panel and second frames displayed on a second display panel, where at least one of the first DPU or the second DPU is associated with the first display panel and the second display panel.

Aspect 12 may be combined with aspect 11 and includes that at least one of the first flush operation or the second flush operation is performed based upon a variable refresh rate (VRR) update being performed with respect to at least one of the first display panel or the second display panel.

Aspect 13 may be combined with any of aspects 1-12 and further includes outputting an indication of the performance of at least one of the first flush operation or the second flush operation.

Aspect 14 may be combined with aspect 13 and includes that outputting the indication of the performance of at least one of the first flush operation or the second flush operation includes: storing the indication of the performance of at least one of the first flush operation or the second flush operation in at least one of a memory, a cache, or a buffer.

Aspect 15 may be combined with any of aspects 1-14 and includes that outputting the indication of the performance of at least one of the first flush operation or the second flush operation includes: transmitting the indication of the performance of at least one of the first flush operation or the second flush operation.

Aspect 16 may be combined with any of aspects 1-15 and includes that performing at least one of the first flush operation or the second flush operation includes: consuming, at the VSync instance, at least one of the first flush operation or the second flush operation based on whether at least one of the first flush operation or the second flush operation is available at the time instance and based on the indication of the synchronous flush or the indication of the asynchronous flush.

Aspect 17 is an apparatus for display processing including a processor coupled to a memory and based on information stored in the memory, the processor is configured to implement a method as in any of aspects 1-16.

Aspect 18 may be combined with aspect 17 and includes that the apparatus is a wireless communication device comprising at least one of a transceiver or an antenna coupled to the processor.

Aspect 19 is an apparatus for display processing including means for implementing a method as in any of aspects 1-16.

Aspect 20 is a computer-readable medium (e.g., a non-transitory computer-readable medium) storing computer executable code, the computer executable code when executed by a processor causes the processor to implement a method as in any of aspects 1-16.

Various aspects have been described herein. These and other aspects are within the scope of the following claims.

What is claimed is:

1. An apparatus for display processing, comprising:
a memory; and
a processor coupled to the memory and, based on information stored in the memory, the processor is configured to:
obtain an indication of a synchronous flush or an indication of an asynchronous flush with respect to at least one of a first display processing unit (DPU) or a second DPU;
determine whether at least one of a first flush operation or a second flush operation is available at a time instance, wherein the first flush operation and the second flush operation are associated with at least one of the first DPU or the second DPU, and wherein the first flush operation and the second flush operation are associated with a swap of a double buffered register configuration; and
perform, based on a vertical synchronization (VSync) instance, at least one of the first flush operation or the second flush operation based on whether at least one of the first flush operation or the second flush operation is available at the time instance and based on the indication of the synchronous flush or the indication of the asynchronous flush.

2. The apparatus of claim 1, wherein to perform at least one of the first flush operation or the second flush operation, the processor is configured to perform a handshake between software associated with at least one of the first DPU or the second DPU and hardware associated with at least one of the first DPU or the second DPU.

3. The apparatus of claim 2, wherein to perform at least one of the first flush operation or the second flush operation, the processor is configured to cause the hardware associated with at least one of the first DPU or the second DPU to swap the double buffered register configuration and clear a flush flag associated with at least one of the first flush operation or the second flush operation.

4. The apparatus of claim 1, wherein the processor is configured to obtain the indication of the synchronous flush, wherein the VSync instance is a next available VSync instance that occurs after the time instance, and wherein to perform at least one of the first flush operation or the second flush operation, the processor is configured to:
perform, at the next available VSync instance, the first flush operation and the second flush operation based on the first flush operation and the second flush operation being available at the time instance.

5. The apparatus of claim 4, wherein the processor is configured to:
obtain, based on the performance of the first flush operation and the second flush operation, the indication of the asynchronous flush;
determine whether at least one of a third flush operation or a fourth flush operation is available at a second time instance that occurs after the time instance, wherein the third flush operation and the fourth flush operation are associated with at least one of the first DPU or the second DPU, and wherein the third flush operation and the fourth flush operation are associated with a second swap of a second double buffered register configuration; and
perform, at a second next available VSync instance, the third flush operation or the fourth flush operation based on the third flush operation or the fourth flush operation being available at the second time instance, wherein the second next available VSync instance is subsequent to the next available VSync instance.

6. The apparatus of claim 1, wherein the processor is configured to obtain the indication of the synchronous flush, wherein the VSync instance is a next available VSync instance at which both the first flush operation and the second flush operation are available, and wherein to perform at least one of the first flush operation or the second flush operation, the processor is configured to:
perform, at the next available VSync instance at which both the first flush operation and the second flush operation are available, the first flush operation and the second flush operation based on the first flush operation and the second flush operation being available at the time instance.

7. The apparatus of claim 1, wherein the processor is configured to obtain the indication of the asynchronous flush, wherein the VSync instance is a next available VSync instance, and wherein to perform at least one of the first flush operation or the second flush operation, the processor is configured to:
perform, at the next available VSync instance, the first flush operation or the second flush operation based on one of the first flush operation or the second flush operation being available at the next available VSync instance.

8. The apparatus of claim 7, wherein the processor is configured to:
obtain, based on the performance of the first flush operation or the second flush operation, the indication of the synchronous flush;
determine whether at least one of a third flush operation or a fourth flush operation is available at a second time instance that occurs after the time instance, wherein the third flush operation and the fourth flush operation are associated with at least one of the first DPU or the second DPU, and wherein the third flush operation and the fourth flush operation are associated with a second swap of a second double buffered register configuration; and
perform, at a second next available VSync instance, the third flush operation and the fourth flush operation based on the third flush operation or the fourth flush operation being available at the second time instance, wherein the second next available VSync instance is subsequent to the next available VSync instance.

9. The apparatus of claim 1, wherein the first flush operation is associated with a first controller of the first DPU and the second flush operation is associated with a second controller of the second DPU.

10. The apparatus of claim 1, wherein the first flush operation is associated with a first controller of the first DPU and the second flush operation is associated with a second controller of the first DPU.

11. The apparatus of claim 1, wherein to perform at least one of the first flush operation or the second flush operation, the processor is configured to maintain a skew between first frames displayed on a first display panel and second frames displayed on a second display panel, wherein at least one of the first DPU or the second DPU is associated with the first display panel and the second display panel.

12. The apparatus of claim 11, wherein to perform at least one of the first flush operation or the second flush operation, the processor is configured to perform at least one of the first flush operation or the second flush operation based upon a variable refresh rate (VRR) update being performed with respect to at least one of the first display panel or the second display panel.

13. The apparatus of claim 1, wherein the processor is further configured to:
output an indication of the performance of at least one of the first flush operation or the second flush operation.

14. The apparatus of claim 13, wherein to output the indication of the performance of at least one of the first flush operation or the second flush operation, the processor is configured to:
store the indication of the performance of at least one of the first flush operation or the second flush operation in at least one of the memory, a cache, or a buffer.

15. The apparatus of claim 13, wherein to output the indication of the performance of at least one of the first flush operation or the second flush operation, the processor is configured to:
transmit the indication of the performance of at least one of the first flush operation or the second flush operation.

16. The apparatus of claim 1, wherein to perform at least one of the first flush operation or the second flush operation, the processor is configured to:
consume, at the VSync instance, at least one of the first flush operation or the second flush operation based on whether at least one of the first flush operation or the second flush operation is available at the time instance and based on the indication of the synchronous flush or the indication of the asynchronous flush.

17. The apparatus of claim 1, wherein the apparatus is a wireless communication device comprising at least one of a transceiver or an antenna coupled to the at least one processor.

18. A method of display processing, comprising:
obtaining an indication of a synchronous flush or an indication of an asynchronous flush with respect to at least one of a first display processing unit (DPU) or a second DPU;
determining whether at least one of a first flush operation or a second flush operation is available at a time instance, wherein the first flush operation and the second flush operation are associated with at least one of the first DPU or the second DPU, and wherein the first flush operation and the second flush operation are associated with a swap of a double buffered register configuration; and
performing, based on a vertical synchronization (VSync) instance, at least one of the first flush operation or the second flush operation based on whether at least one of the first flush operation or the second flush operation is available at the time instance and based on the indication of the synchronous flush or the indication of the asynchronous flush.

19. The method of claim 18, wherein performing at least one of the first flush operation or the second flush operation comprises performing a handshake between software associated with at least one of the first DPU or the second DPU and hardware associated with at least one of the first DPU or the second DPU.

20. The method of claim 19, wherein performing the handshake causes the hardware associated with at least one of the first DPU or the second DPU to swap the double buffered register configuration and clear a flush flag associated with at least one of the first flush operation or the second flush operation.

21. The method of claim 18, wherein the indication of the synchronous flush is obtained, wherein the VSync instance is a next available VSync instance that occurs after the time instance, and wherein performing at least one of the first flush operation or the second flush operation comprises:

performing, at the next available VSync instance, the first flush operation and the second flush operation based on the first flush operation and the second flush operation being available at the time instance.

22. The method of claim 21, further comprising:
obtaining, based on the performance of the first flush operation and the second flush operation, the indication of the asynchronous flush;
determining whether at least one of a third flush operation or a fourth flush operation is available at a second time instance that occurs after the time instance, wherein the third flush operation and the fourth flush operation are associated with at least one of the first DPU or the second DPU, and wherein the third flush operation and the fourth flush operation are associated with a second swap of a second double buffered register configuration; and
performing, at a second next available VSync instance, the third flush operation or the fourth flush operation based on the third flush operation or the fourth flush operation being available at the second time instance, wherein the second next available VSync instance is subsequent to the next available VSync instance.

23. The method of claim 18, wherein the indication of the synchronous flush is obtained, wherein the VSync instance is a next available VSync instance at which both the first flush operation and the second flush operation are available, and wherein performing at least one of the first flush operation or the second flush operation comprises:
performing, at the next available VSync instance at which both the first flush operation and the second flush operation are available, the first flush operation and the second flush operation based on the first flush operation and the second flush operation being available at the time instance.

24. The method of claim 18, wherein the indication of the asynchronous flush is obtained, wherein the VSync instance is a next available VSync instance, and wherein performing at least one of the first flush operation or the second flush operation comprises:
performing, at the next available VSync instance, the first flush operation or the second flush operation based on one of the first flush operation or the second flush operation being available at the next available VSync instance.

25. The method of claim 24, further comprising:
obtaining, based on the performance of the first flush operation or the second flush operation, the indication of the synchronous flush;
determining whether at least one of a third flush operation or a fourth flush operation is available at a second time instance that occurs after the time instance, wherein the third flush operation and the fourth flush operation are associated with at least one of the first DPU or the second DPU, and wherein the third flush operation and the fourth flush operation are associated with a second swap of a second double buffered register configuration; and
performing, at a second next available VSync instance, the third flush operation and the fourth flush operation based on the third flush operation or the fourth flush operation being available at the second time instance, wherein the second next available VSync instance is subsequent to the next available VSync instance.

26. The method of claim 18, wherein the first flush operation is associated with a first controller of the first DPU and the second flush operation is associated with a second controller of the second DPU.

27. The method of claim 18, wherein the first flush operation is associated with a first controller of the first DPU and the second flush operation is associated with a second controller of the first DPU.

28. The method of claim 18, wherein performing at least one of the first flush operation or the second flush operation maintains a skew between first frames displayed on a first display panel and second frames displayed on a second display panel, wherein at least one of the first DPU or the second DPU is associated with the first display panel and the second display panel.

29. The method of claim 28, wherein at least one of the first flush operation or the second flush operation is performed based upon a variable refresh rate (VRR) update being performed with respect to at least one of the first display panel or the second display panel.

30. A non-transitory computer-readable medium storing computer executable code, the computer executable code when executed by at least one processor causes the processor to:
obtain an indication of a synchronous flush or an indication of an asynchronous flush with respect to at least one of a first display processing unit (DPU) or a second DPU;
determine whether at least one of a first flush operation or a second flush operation is available at a time instance, wherein the first flush operation and the second flush operation are associated with at least one of the first DPU or the second DPU, and wherein the first flush operation and the second flush operation are associated with a swap of a double buffered register configuration; and
perform, based on a vertical synchronization (VSync) instance, at least one of the first flush operation or the second flush operation based on whether at least one of the first flush operation or the second flush operation is available at the time instance and based on the indication of the synchronous flush or the indication of the asynchronous flush.

* * * * *